US 7,760,606 B2

(12) United States Patent
Yanagawa et al.

(10) Patent No.: US 7,760,606 B2
(45) Date of Patent: Jul. 20, 2010

(54) RECORDING APPARATUS AND RECORDING METHOD, AND COMPUTER PROGRAM

(75) Inventors: Naoharu Yanagawa, Saitama (JP); Akira Shirota, Saitama (JP)

(73) Assignee: Pioneer Corporation, Tokyo (JP)

(*) Notice: Subject to any disclaimer, the term of this patent is extended or adjusted under 35 U.S.C. 154(b) by 473 days.

(21) Appl. No.: 11/915,432

(22) PCT Filed: May 25, 2006

(86) PCT No.: PCT/JP2006/310444
§ 371 (c)(1),
(2), (4) Date: Nov. 26, 2007

(87) PCT Pub. No.: WO2006/126631
PCT Pub. Date: Nov. 30, 2006

(65) Prior Publication Data
US 2009/0147650 A1 Jun. 11, 2009

(30) Foreign Application Priority Data
May 25, 2005 (JP) .............................. 2005-152335

(51) Int. Cl.
*G11B 11/00* (2006.01)
(52) U.S. Cl. .................... 369/53.26; 369/47.51; 369/94; 369/124.03
(58) Field of Classification Search ................... None
See application file for complete search history.

(56) References Cited

U.S. PATENT DOCUMENTS 5,410,531 A * 4/1995 Tsujioka ................ 369/124.03

2003/0026189 A1 2/2003 Richter et al.
2005/0094532 A1 5/2005 Akiyama et al.
2005/0135218 A1 6/2005 Akiyama et al.

FOREIGN PATENT DOCUMENTS

| JP | 2000-195097   | 4/2000 |
| JP | 2000-187879   | 7/2000 |
| JP | 2000-187879 A | 7/2000 |
| JP | 2000-195097 A | 7/2000 |
| JP | 2001-126334 A | 5/2001 |
| JP | 2004-022116 A | 1/2004 |
| JP | 2004-246943   | 9/2004 |
| JP | 2005-011404 A | 1/2005 |
| JP | 2005-129154 A | 5/2005 |

OTHER PUBLICATIONS

International Search Report of PCT/JP2006/310444 filed May 25, 2006, date of mailing Jun. 27, 2006.

* cited by examiner

*Primary Examiner*—Paul Huber
(74) *Attorney, Agent, or Firm*—Young & Thompson

(57) ABSTRACT

A recording apparatus for recording record data onto a recording medium on which a plurality of recording layers are formed in a thickness direction, is provided with: a recording device for recording the record data into each of the plurality of recording layers by emitting each of a plurality of recording light beams to be focused on a corresponding one of the plurality of recording layers; a calculating device for calculating a leaked beam feature of another recording light beam, which is emitted to be focused on another recording layer other than one recording layer of the plurality of recording layers, leaking to the one recording layer; and an adjusting device for adjusting an emission condition of at least one of the plurality of recording light beams, on the basis of the calculated leaked beam feature.

18 Claims, 12 Drawing Sheets (a)

(b)

(a)

(b)

(a)

(b)

| CW/L0 (dB) | CW/L1 (dB) | Power/L0 (%) | Power/L1 (%) |
|---|---|---|---|
| a1 | b1 | A1 | B1 |
| a2 | b2 | A2 | B2 |
| . . | . . | . . | . . |
| an | bn | An | Bn |

RECORDING APPARATUS AND RECORDING METHOD, AND COMPUTER PROGRAM

This application is a 371 of PCT/JP2006/310444, filed May 25, 2006.

TECHNICAL FIELD

The present invention relates to a recording apparatus and method, such as a DVD recorder, and a computer program which makes a computer function as such a recording apparatus.

BACKGROUND ART

A data writable optical disc, such as a DVD±R and a DVD±RW, conventionally includes not only a single-layer disc with one recording layer formed in which record data is recorded, but also a multilayer disc with a plurality of recording layers. For example, currently commercialized discs are a single-sided, single layer type DVD provided with only one recording layer, a single-sided, dual layer type DVD provided with two recording layers on one side, and the like. The single-sided, single layer type DVD has a maximum recording capacity of about 4.7 GB, while the single-sided, dual layer type DVD has a maximum recording capacity of about 8.5 GB. As described above, as the number of recording layers increases, the maximum recording capacity of the optical disc increases.

By the way, a recording/reproducing apparatus, which can perform the recording of the record data and the reproduction of the recorded record data on the aforementioned multilayer disc, normally records the record data into only one recording layer in the process of recording the record data, and it does not perform anything on the other recording layers. For example, the recording/reproducing apparatus performs such a recording process that the record data is recorded into an entire first recording layer (or L0 layer) before the record data is recorded into a second recording layer (or L1 layer). Therefore, although the maximum recording capacity of the optical disc increases, a recording speed with respect to the multilayer disc is not different from a recording speed with respect to the single layer disc. Incidentally, the recording speed with respect to the single layer disc (in other words, the recording speed with respect to one recording layer) is considered to be limited to be about 16 times (in case of a DVD) larger than a reference recording speed (or 1-time recording speed) because of mechanical properties or the like of the recording/reproducing apparatus and the optical disc.

A patent document 1 discloses a technology in which an initialize process is performed simultaneously on two recording layers, with regard to the initialize process of the multilayer disc.

Patent document 1: Japanese Patent Application Laid Open NO. 2004-22116

DISCLOSURE OF INVENTION

Subject to be Solved by the Invention

By simultaneously performing the initialization on the two recording layers as described above, it is expected to increase an initialization speed; however, the technology disclosed in the patent document 1 allows only the initialization process using a light beam which is thicker than a light beam used for the recording of the normal record data. The normal record data cannot be appropriately recorded simultaneously into the two recording layers.

Moreover, even if the record data is recorded simultaneously into the two recording layers, the light beam, which is irradiated onto the first recording layer to record the data, is also irradiated onto the second recording layer. Thus, as a result, it has such a technical problem that cross-write is generated between the recording layers.

It is therefore an object of the present invention to provide a recording apparatus and method, and a computer program, which allow simultaneous recording into a plurality of recording layers to be appropriately performed on a recording medium provided with the plurality of recording layers.

Means for Solving the Subject (Recording Apparatus)

The above object of the present invention can be achieved by a recording apparatus for recording record data onto a recording medium on which a plurality of recording layers are formed in a thickness direction, the recording apparatus provided with: a recording device for recording the record data into each of the plurality of recording layers by emitting each of a plurality of recording light beams to be focused on a corresponding one of the plurality of recording layers; a calculating device for calculating a leaked beam feature of another recording light beam, which is emitted to be focused on another recording layer other than one recording layer of the plurality of recording layers, leaking to the one recording layer; and an adjusting device for adjusting an emission condition of at least one (or each) of the plurality of recording light beams, on the basis of the calculated leaked beam feature.

According to the recording apparatus of the present invention, it is possible to record the data into each of the plurality of recording layers, because the plurality of recording light beams are emitted to be focused on the corresponding recording layers by the operation of the recording device. For example, a first recording light beam is emitted to be focused on a first recording layer, and a second recording light beam is emitted to be focused on a second recording layer. By this, it is possible to record the record data into each of the first recording layer and the second recording layer.

In particular, in the present invention, the leaked beam feature of the another recording light beam(s) leaking to one recording layer, which is emitted to be focused on another recording layer other than the one recording layer of the plurality of recording layers, is calculated by the operation of the calculating device. In other words, the leaked beam feature of the another beam other than one recording light beam emitted to record the data into the one recording layer (or focused on the one recording layer) leaking to one recording layer, is calculated. Here, the "leaked beam feature" in the present invention indicates an influence of the emission of another recording light beam on the one recording layer. In other words, it indicates an influence, on the one recording layer, of the emission of the recording light beam that originally does not contribute to the recording of the record data into the one recording layer (so to speak, the recording light beam that is leaked to the one recording layer). On the basis of the calculated leaked beam feature, the emission condition of the plurality of recording light beams is adjusted by the operation of the adjusting device. As a result, the recording device emits the plurality of recording light beams with the emission condition adjusted, thereby the data is recorded into each of the plurality of recording layers.

As described above, by focusing the plurality of light beams on respective different recording layers on the recording medium having the plurality of recording layers, it is possible to simultaneously record the record data into the plurality of recording layers (moreover, simultaneously reproduce the record data recorded in the plurality of recording layers). By this, compared to a recording apparatus which performs a recording process only on a single recording layer, the recording apparatus of the present invention simultaneously performs the recording process (and further a reproduction process) on the plurality of recording layers. Thus, it is possible to increase a recording speed (and further a reproduction speed) with respect to the recording medium.

Moreover, the emission condition of each of the plurality of recording light beams (or at least one of the plurality of recording light beams) is adjusted on the basis of the leaked beam feature. Thus, if one recording light beam is emitted to one recording layer, the record data can be preferably recorded into the one recording layer, without being influenced by another recording light beam emitted to another recording layer (or without the another recording light beam hindering the recording operation performed on the one recording layer). For example, the record data can be preferably recorded into the one recording layer without generating cross-write caused by the another recording light beam.

Incidentally, it is tried by the inventors of the present invention to increase the recording speed or the like by increasing the number of rotations of the recording medium, and it is found out that there is a limit for rotating the recording medium because of the mechanical strength of the recording medium and specification restrictions of a spindle motor or the like. The present invention can further increase the recording speed or the like beyond such a limit and can keep the record data high-quality. In this regard, it can be said that this is the recording apparatus having more excellent advantages than ever before.

Consequently, according to the recording apparatus of the present invention, it is possible to perform the simultaneous recording of the record data into the plurality of recording layers, on the recording medium having the plurality of recording layers.

In one aspect of the recording apparatus of the present invention, the calculating device calculates a plurality of the leaked beam features such that each of the plurality of recording layers becomes the one recording layer in order, and the adjusting device adjusts the emission condition on the basis of the plurality of leaked beam features.

According to this aspect, with regard to each of the plurality of recording layers, it is possible to calculate the leaked beam feature caused by the recording light beam other than the recording light beam emitted to record the record data into each of the recording layers. Therefore, it is possible to preferably record the record data into each of the plurality of recording layers.

In another aspect of the recording apparatus of the present invention, the adjusting device adjusts the emission condition such that recording quality of the record data when the record data is recorded into the one recording layer without emitting the another recording light beam substantially matches recording quality of the record data when the record data is recorded into the one recording layer with emitting the another recording light beam.

According to this aspect, it is possible to preferably record the record data into each of the plurality of recording layers, with eliminating the influence caused by the recording light beam other than the recording light beam emitted to record the record data into each recording layer.

In this aspect, the recording quality may be at least one of asymmetry, degree of modulation, jitter, error rate, and wobble feature.

By virtue of such construction, by adjusting the emission condition on the basis of those recording qualities, it is possible to preferably record the record data into each of the plurality of recording layers, with eliminating the influence caused by the recording light beam other than the recording light beam emitted to record the record data into each recording layer.

In another aspect of the recording apparatus of the present invention, the leaked beam feature is extent of cross-write in the one recording layer, which is caused by the another recording light beam.

According to this aspect, the emission condition of the plurality of light beams can be preferably adjusted on the basis of the extent of the cross-write generated in the one recording layer (or in each recording layer).

In an aspect of the recording apparatus in which the leaked beam feature is the extent of the cross-write, as described above, the adjusting device may adjust the emission condition such that an influence of the cross-write is substantially zero.

By virtue of such construction, it is possible to preferably record the record data into each of the plurality of recording layers, with eliminating the influence of the cross-write generated because of the recording beam other than the recording light beam emitted to record the data into each recording layer.

In another aspect of the recording apparatus of the present invention, the adjusting device adjusts a power of each of the recording light beams, as the emission condition.

According to this aspect, by adjusting the power of the recording light beam, it is possible to preferably record the record data into each of the plurality of recording layers, relatively easily.

In another aspect of the recording apparatus of the present invention, the adjusting device adjusts the emission condition, on the basis of association information which indicates an association between the leaked beam feature and the emission condition of the recording light beam.

According to this aspect, it is possible to adjust the emission condition of the recording light beam, relatively easily, on the basis of the association information.

In another aspect of the recording apparatus of the present invention, it is further provided with a generating device for generating association information which indicates an association between the leaked beam feature and the emission condition of the recording light beam.

According to this aspect, the association information can be generated by the operation of the generating device. The association information is generated on the basis of the adjustment result of the emission condition of each of the plurality of recording light beams by the operation of the adjusting device. As a result, the adjusting device can subsequently adjust the emission condition of the recording light beam, relatively easily, on the basis of the generated association information.

In another aspect of the recording apparatus of the present invention, it is further provided with a modifying device for modifying the association information, on the basis of an adjustment result by the adjusting device.

According to this aspect, the association information can be modified, as occasion demands, so that the adjustment result of the emission condition in the actual recording operation can be reflected in the association information. As a result, the adjusting device can adjust the emission condition of the recording light beam, relatively easily and preferably, on the basis of the association information in which the adjustment result of the emission condition in the actual recording operation is reflected.

In another aspect of the recording apparatus of the present invention, the calculating device calculates the leaked beam feature again after the emission condition is adjusted by the adjusting device, and the adjusting device adjusts the emission condition again, on the basis of the leaked beam feature calculated again.

According to this aspect, after the emission condition is adjusted, the leaked beam feature is calculated again. As a result, if it is necessary to adjust the emission condition of the recording light beam again, the emission condition of the recording light beam is adjusted again. Therefore, it is possible to preferably record the record data into each of the plurality of recording layers by using the recording light beam with the more preferable emission condition.

In another aspect of the recording apparatus of the present invention, it is further provided with: a controlling device for controlling the recording device to record test data into each of the plurality of recording layers, as the record data; and a reading device for reading the test data recorded in the one recording layer, the calculating device comparing the test data actually recorded by the recording device with the test data read by the reading device, to thereby calculate the leaked beam feature.

According to this aspect, the test data is recorded into each of the plurality of recording layers by the operation of the controlling device. Then, the test data recorded in each of the plurality of recording layers is read by the operation of the reading device. After that, the test data actually recorded by the recording device (i.e. the actual original data) and the test data read by the reading device (i.e. the data influenced by another recording light beam emitted to be focused on another recording layer other than the recording layer in which the test data is recorded) are compared by the operation of the calculating device. On the basis of the comparison result, the calculating device calculates the leaked beam feature. For example, the leaked beam feature is calculated from a difference between the test data actually recorded by the recording device and the test data read by the reading device. By this, it is possible to preferably adjust the emission condition of the plurality of recording light beams.

In another aspect of the recording apparatus of the present invention, it is further provided with: a verifying device for reading the record data recorded by the recording device, by emitting each of a plurality of verification light beams on a corresponding one of the plurality of recording layers, the calculating device calculating the leaked beam feature on the basis of the record data read by the verifying device.

According to this aspect, the record data actually recorded by the recording device is read (i.e. verified) by the operation of the verifying device. Then, the leaked beam feature is calculated by the read record data. Therefore, on the basis of the leaked beam feature obtained from the record data actually recorded, it is possible to preferably adjust the emission condition of the plurality of recording light beams in accordance with the actual recording aspect.

In particular, the verification light beam is emitted in addition to the recording light beam. Thus, it is possible to preferably adjust the emission condition of the plurality of recording light beams, without a significant influence on the recording operation of the record data by the recording device, and further in real time in parallel with the recording operation.

In an aspect of the recording device provided with the verifying device, as described above, the calculating device may compare the record data actually recorded by the recording device with the record data read by the verifying device, to thereby calculate the leaked beam feature.

By virtue of such construction, it is possible to preferably adjust the emission condition of the plurality of recording light beams.

In an aspect of the recording device provided with the verifying device, as described above, a focal point of the verification light beam may follow a focal point of the recording light beam, in a travelling direction of the recording light beam with respect to the recording medium.

By virtue of such construction, the record data actually recorded with the recording light beam by the recording device can be read by using the verification light beam which follows the recording light beam. Therefore, it is possible to adjust the emission condition of the recording light beam in real time, more preferably.

In another aspect of the recording apparatus of the present invention, the recording device simultaneously emits each of the plurality of recording light beams to be focused on the corresponding one of the plurality of recording layers, to thereby simultaneously record the record data into each of the plurality of recording layers.

According to this aspect, it is possible to simultaneously record the data into each of the plurality of recording layers.

(Recording Method)

The above object of the present invention can be also achieved by a recording method of recording record data onto a recording medium on which a plurality of recording layers are formed in a thickness direction, the recording method provided with: a recording process of recording the record data into each of the plurality of recording layers by emitting each of a plurality of recording light beams to be focused on a corresponding one of the plurality of recording layers; a calculating process of calculating a leaked beam feature of another recording light beam, which is emitted to be focused on another recording layer other than one recording layer of the plurality of recording layers, leaking to the one recording layer; and an adjusting process of adjusting an emission condition of at least one of the plurality of recording light beams, on the basis of the calculated leaked beam feature.

According to the recording method of the present invention, it is possible to receive the same various benefits as those of the aforementioned recording apparatus of the present invention.

Incidentally, in response to the various aspects of the recording apparatus of the present invention described above, the recording method of the present invention can employ various aspects.

(Computer Program)

The above object of the present invention can be also achieved by a computer program for recording control to control a computer provided in the aforementioned recording apparatus of the present invention (including its various aspects), the computer program making the computer function as at least one portion of the recording device, the calculating device, and the adjusting device.

According to the computer program of the present invention, the aforementioned recording apparatus of the present invention can be relatively easily realized as a computer reads and executes the computer program from a program storage device, such as a ROM, a CD-ROM, a DVD-ROM, and a hard disk, or as it executes the computer program after downloading the program through a communication device.

Incidentally, in response to the various aspects in the aforementioned recording apparatus of the present invention, the computer program of the present invention can adopt various aspects.

The above object of the present invention can be also achieved by a computer program product in a computer-readable medium for tangibly embodying a program of instructions executable by a computer provided in the aforementioned recording apparatus of the present invention (including its various aspects), the computer program product making a computer function as at least one portion of the recording device, the calculating device, and the adjusting device.

According to the computer program product of the present invention, the aforementioned recording apparatus of the present invention can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as the aforementioned recording apparatus of the present invention.

These effects and other advantages of the present invention will become more apparent from the following embodiments.

As explained above, the recording apparatus of the present invention is provided with the recording device, the calculating device, and the adjusting device. The recording method of the present invention is provided with the recording process, the calculating process, and the adjusting process. Therefore, it is possible to appropriately perform the simultaneous recording into the plurality of recording layers, on the recording medium having the plurality of recording layers.

DESCRIPTION OF REFERENCE CODES

111 HR for first recording layer
112 HR for second recording layer
206 strategy condition circuit for first recording layer
207 strategy condition circuit for second recording layer
208 interlayer cross-write elimination circuit
D0 laser driving circuit for first recording layer
D1 laser driving circuit for second recording layer
DK optical disc
L0 first recording layer
L1 second recording layer
RP recording/reproducing apparatus
PU optical pickup
C control device
SP signal processing device
BS beam splitter

BEST MODE FOR CARRYING OUT THE INVENTION

Hereinafter, the best mode for carrying out the invention will be explained in each embodiment in order, with reference to the drawings.

(Structure of Optical Disc)

Firstly, an optical disc DK on which data is recorded and the recorded data is reproduced by a recording/reproducing apparatus in this embodiment will be explained by using FIG. 1.

Figure 1:
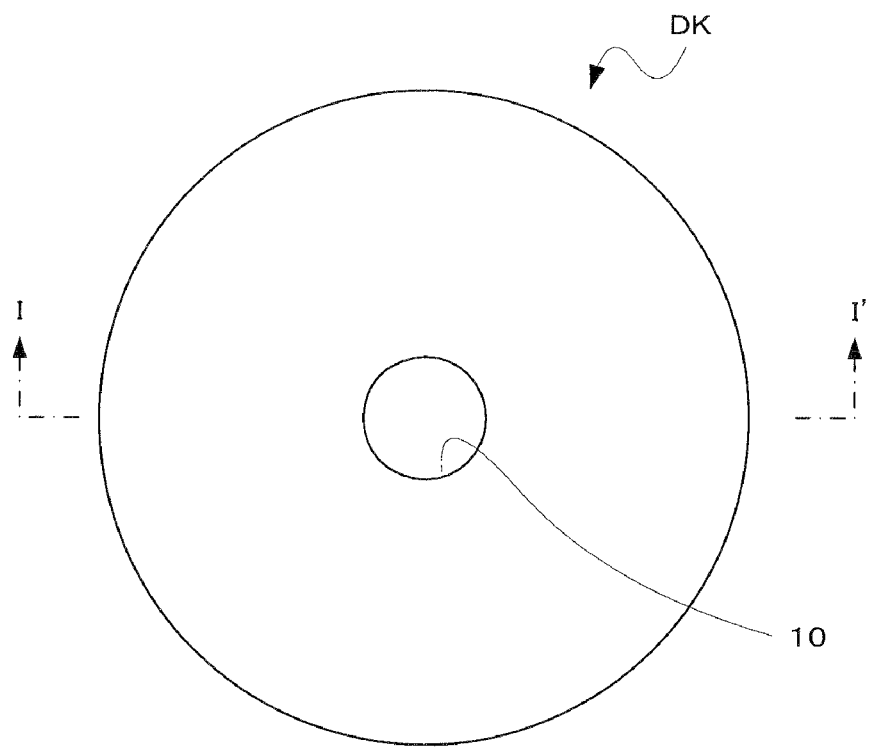
FIG. 1 are diagrams showing the outline structure of an optical disc in an embodiment.
Figure 1:
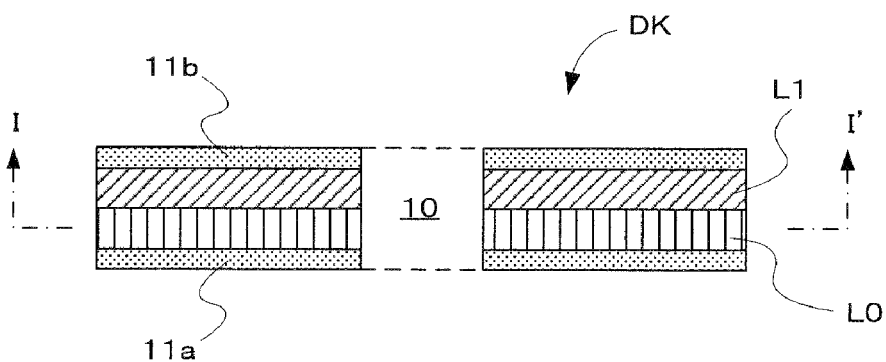

FIG. 1 are diagrams showing the outline structure of the dual-layer type optical disc DK. FIG. 1(a) shows a plan view of the optical disc DK, and FIG. 1(b) shows a cross sectional view of the optical disc DK along a section line I-I' in FIG. 1(a). The optical disc DK is disc-shaped, with a diameter of a about 12 cm, and it is provided with a center hole 10 in the center. As an example of the optical disc DK, there are listed, for example, a DVD±R, a DVD±RW, a DVD-RAM, a BD (Blu-ray Disc), a HD DVD, and the like. As shown in FIG. 1(b), the optical disc DK has such a structure that a first recording layer L0 and a second recording layer L1 are laminated between transparent substrates 11a and 11b. Specifically, between the first recording layer L0 and the second recording layer L1, there are formed a dielectric layer, a reflective film, an adhesive layer, and the like, which are not illustrated. Moreover, in each recording area of the first recording layer L0 and the second recording layer L1, a track or tracks, such as a groove track and a land track, which are not illustrated, are alternately provided, spirally or concentrically, centered on the center hole 10. On the track, the data is divided and recorded by an ECC block unit.

(Structure of Recording/Reproducing Apparatus)

Next, the structure of a recording/reproducing apparatus RP as an embodiment of the recording apparatus of the present invention will be explained by using FIG. 2.

The recording/reproducing apparatus RP is provided with: a signal processing device SP; a laser driving circuit D0 for the first recording layer; a laser driving circuit D1 for the second recording layer; a LPP/wobble detection circuit LPD; a control device C; a focus servo circuit FS; a tracking servo circuit TS; a tracking servo drive circuit TD; a drive circuit S for aberration correction; a tracking error signal generation circuit TG; a reproduction device P; and an optical pickup PU. The recording/reproducing apparatus RP is an apparatus for recording the data and reproducing the record data recorded on the optical disc DK, by irradiating the optical disc DK with a light beam (or laser light). Incidentally, the recording/reproducing apparatus RP in the embodiment performs a process on the dual-layer type optical disc DK with the first recording layer L0 and the second recording layer L1 formed, as shown in FIG. 1.

Now, an explanation is given on the structure of the optical pickup PU, which constitutes one specific example of the "recording device" of the present invention with the control device C. The optical pickup PU is provided with: an objective lens 102; an actuator device 101 for holding the objective lens 102; a condenser lens 104; a beam splitter BS; a hologram laser 111 for the first recording layer (hereinafter, the "hologram laser" is simply expressed by "HR"); a HR 112 for the second recording layer; a piezo element 120; and an aberration correction element 121.

The HR 111 for the first recording layer and the HR 112 for the second recording layer have a laser tip, a substrate, a light receiving element, a hologram element, and the like, which are not illustrated. The laser tip and the light receiving element are disposed on the same substrate, and the hologram element is disposed on the light-beam-output-side of the substrate so as to face to the substrate. The laser tip outputs the light beam, and the light receiving element receives the inputted light beam. The hologram element transmits the light beam outputted from the laser tip as it is, and refracts the light beam entering from the opposite side of the incident surface of the light beam, to thereby focus it on the light receiving element on the substrate. As described above, the HR 111 for the first recording layer and the HR 112 for the second recording layer have a function as a light source and a detector.

The HR 111 for the first recording layer emits a light beam A1, shown by dashed lines, and the HR 112 for the second recording layer emits a light beam B1, shown by alternate long and short dash lines. In this case, the HR 111 for the first recording layer and the HR 112 for the second recording layer output the respective light beams, which are linearly polarized with respect to polarization directions which are different from each other. Specifically, the light beam A1 emitted from the HR 111 for the first recording layer is P-polarized (i.e. is transverse electric (TE) wave) (hereinafter this light beam is referred to as a "P-polarized light beam"), and the light beam B1 emitted from the HR 112 for the second recording layer is S-polarized (i.e. is transverse magnetic (TM) wave) (hereinafter this light beam is referred to as a "S-polarized light beam").

With regard to the optical pickup PU, the structure on the side of the HR 112 for the second recording layer is different from that on the side of the HR 111 for the first recording layer, in that the piezo element 120 is provided for the HR 112 for the second recording layer. Moreover, the P-polarized light beam A1, which is emitted from the HR 111 for the first recording layer, directly enters the beam splitter BS. In contrast, the S-polarized light beam B1, which is emitted from the HR 112 for the second recording layer, enters the beam splitter BS through the aberration correction element 121.

The piezo element 120 displaces the HR 112 for the second recording layer, in a tracking direction, in accordance with a servo control signal S14T supplied from the tracking servo drive circuit TD. The piezo element 120 elongates and contracts in the tracking direction, by an amount corresponding to the supplied servo control signal (or voltage) S14T. By this, the piezo element 120 accurately displaces the HR 112 for the second recording layer in the tracking direction. As described above, the piezo element 120 functions as the displacing device.

The aberration correction element 121 is driven by a driving signal S8 supplied from the drive circuit S for aberration correction. Specifically, the aberration correction element 121 is provided with: a liquid crystal layer; transparent electrodes; a glass substrate; and the like, which are not illustrated. In the aberration correction element 121, the orientation of liquid crystal molecules included in the liquid crystal layer is changed by applying a predetermined voltage between the transparent electrodes, and the refractive index of the aberration correction element 121 is changed. As described above, the aberration correction element 121 functions as the correcting device.

Figure 3:
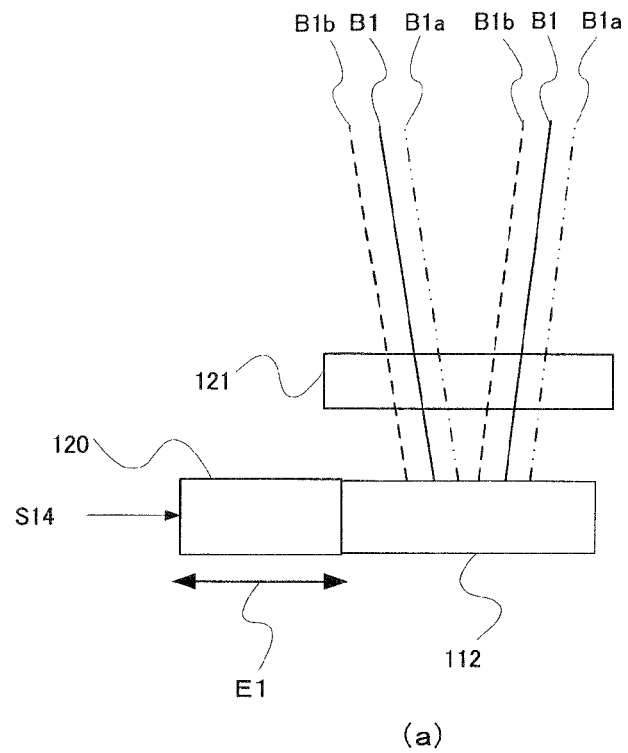
FIG. 3 are diagrams specifically showing a change in the optical path of a light beam when a piezo element and an aberration correction element are controlled.
Figure 3:
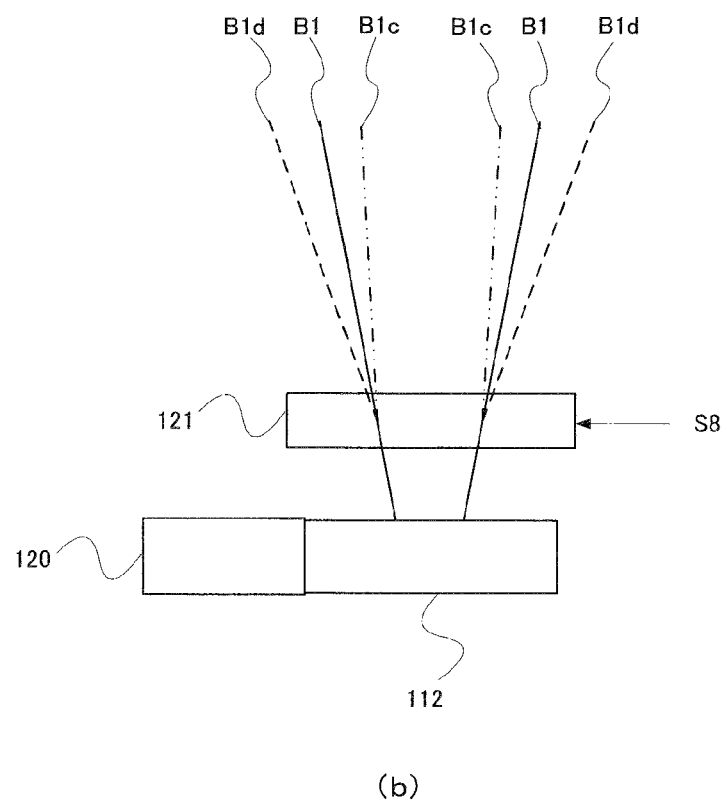

Now, an explanation is given on a change in the S-polarized light beam B1 when the piezo element 120 and the aberration correction element 121 are driven, by using FIG. 3.

FIG. 3(a) is a view showing a change in the S-polarized light beam B1 when the piezo element 120 is driven. As shown by an arrow E1, if the piezo element 120 is controlled to displace the HR 112 for the second recording layer, the optical path of the S-polarized light beam B1 is changed as shown by reference numerical B1a and B1b. By this, a position in which the S-polarized light beam B1 enters the beam splitter BS is changed. That is, a position in which the S-polarized light beam B1 is focused on the optical disc DK is changed. As described above, by controlling the piezo element 120 to appropriately displace the HR 112 for the second recording layer, it is possible to limit or eliminate the influence of an eccentricity between the first recording layer L0 and the second recording layer L1 of the optical disc DK.

Incidentally, the piezo element 120 may be constructed to displace the HR 112 for the second recording layer in a focus direction. For example, although the distance between the first recording layer L0 and the second recording layer L1 varies depending on the type or the like of the optical disc DK, the difference in the distance can be corrected by controlling the piezo element 120 constructed in the above manner to displace the HR 112 for the second recording layer in the focus direction.

FIG. 3(b) is a view showing a change in the S-polarized light beam B1 when the aberration correction element 121 is driven. If the aberration correction element 121 is controlled, the refractive index or refractive index distribution of the aberration correction element 121 is changed, and the S-polarized light beam B1, which is transmitted through the aberration correction element 121, becomes the light beam as shown with numerical references B1c and B1d. Therefore, by controlling the driving signal S8 supplied to the aberration correction element 121, it is possible to adjust a position on the objective lens 102 and an incident angle with respect to the objective lens 102 when the S-polarized light beam B1, which is emitted from the HR 112 for the second recording layer, enters the objective lens 102. By controlling the aberration correction element 121 as described above, it is possible to correct aberration, such as spherical aberration and coma aberration.

Incidentally, the piezo element 120 and the aberration correction element 121 may be also provided for the HR 111 for the first recording layer.

Figure 2:
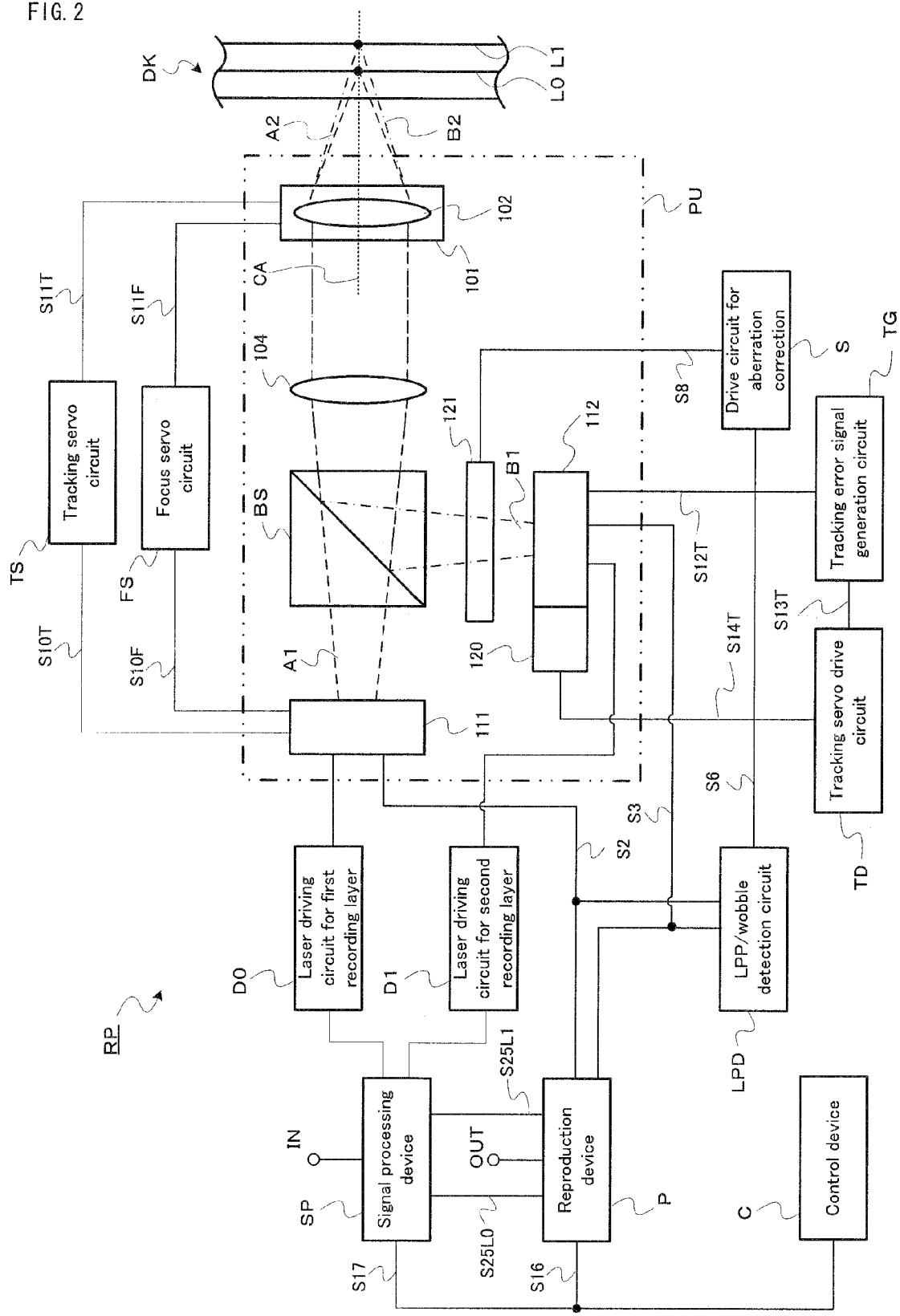
FIG. 2 is a block diagram showing the outline structure of a recording/reproducing apparatus in an embodiment.

Back in FIG. 2, an explanation will be further given. The P-polarized light beam A1, which is emitted from the HR 111 for the first recording layer, and the S-polarized light beam B1, which is emitted from the HR 112 for the second recording layer and is transmitted through the aberration correction element 121, enter the beam splitter BS.

The beam splitter BS reflects the S-polarized light and transmits the P-polarized light. Therefore, the beam splitter BS transmits the P-polarized light beam A1, which is emitted from the HR 111 for the first recording layer, toward the direction of the condenser lens 104, and it reflects the S-polarized light beam B1, which is emitted from the HR 112 for the second recording layer and which is transmitted through the aberration correction element 121, toward the direction of the condenser lens 104.

The P-polarized light beam A1, which is transmitted through the beam splitter BS, and the S-polarized light beam B1, which is reflected by the beam splitter BS, enter the condenser lens 104. The condenser lens 104 changes the entering light beams to substantially parallel light and makes the light beams enter into the objective lens 102.

The objective lens 102 is provided for the actuator device 101. The actuator device 101 has a driving mechanism for changing the disposed position of the objective lens 102. The actuator device 101 displaces the position of the objective lens 102 in the focus direction and in the tracking direction, in accordance with a servo control signal S11F supplied from the focus servo circuit FS and a servo control signal S11T supplied from the tracking servo circuit TS.

The P-polarized light beam A1 and the S-polarized light beam B1, which are changed to the substantially parallel light by the condenser lens 104, enter the objective lens 102. The objective lens 102 collects those light beams and irradiates them onto the optical disc DK. Specifically, the objective lens 102 focuses a P-polarized light beam A2 on the first recording layer L0 of the optical disc DK, and focuses an S-polarized light beam B2 on the second recording layer L1 of the optical disc DK.

The P-polarized light beam A2 focused on the first recording layer L0 is reflected by the first recording layer L0 (hereinafter this reflected light is to as "P-polarized reflected light"). Then, it is transmitted through the objective lens 102 and the condenser lens 104, and further the beam splitter BS, and it enters the HR 111 for the first recording layer. That is, the HR 111 for the first recording layer receives the P-polarized reflected light. In contrast, the S-polarized light beam B2 focused on the second recording layer L1 is reflected by the second recording layer L1 (hereinafter this reflected light is referred to as "S-polarized reflected light"). Then, it is transmitted through the objective lens 102 and the condenser lens 104, and further the beam splitter BS, and it enters the HR 112 for the second recording layer. That is, the HR 112 for the second recording layer receives the S-polarized reflected light.

Next, an explanation will be given on the constituent elements of the recording/reproducing apparatus RP other than the optical pickup PU.

The signal processing device SP has an input terminal IN. The signal processing device SP performs signal processing on the data inputted from the exterior through the input terminal IN on the basis of a control signal S17 supplied from the control device C, and outputs the data to the laser driving circuit D0 for the first recording layer and the laser driving circuit D1 for the second recording layer, as a record signal. Incidentally, the control signal S17 includes a control signal for the HR 111 for the first recording layer and a control signal for the HR 112 for the second recording layer.

Figure 4:
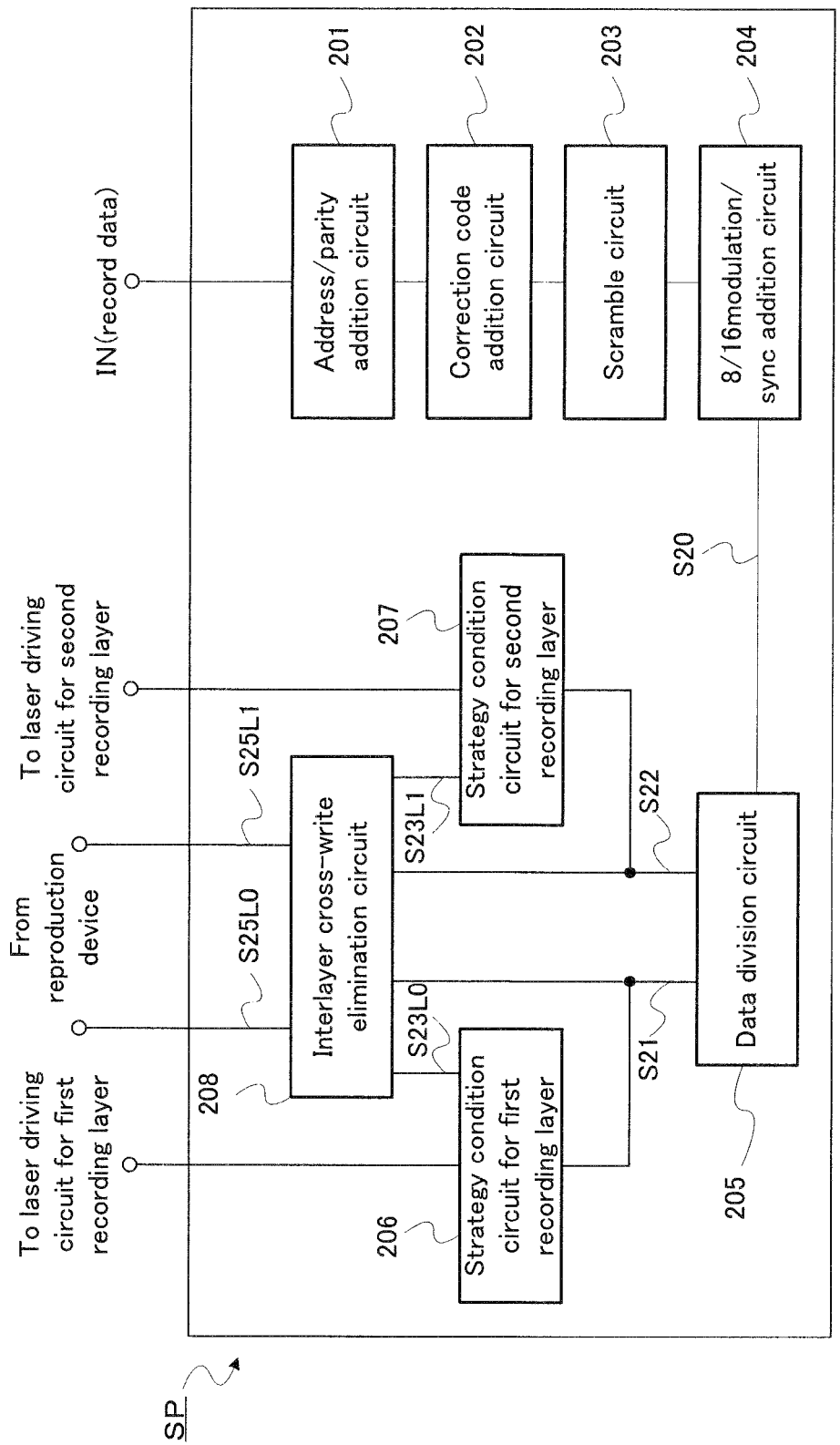
FIG. 4 is a block diagram showing one outline structure of a control device provided for the recording/reproducing apparatus in the embodiment.

Now, the more specific structure of the signal processing device SP is explained with reference to FIG. 4. FIG. 4 is a block diagram showing one outline structure of a control device SP provided for the recording/reproducing apparatus RP in the embodiment.

As shown in FIG. 4, the signal processing device SP is provided with: an address/parity addition circuit 201; a correction code addition circuit 202; a scramble circuit 203; an 8/16 modulation/sync addition circuit 204; a data division circuit 205; a strategy condition circuit 206 for the first recording layer; a strategy condition circuit 207 for the second recording layer; and an interlayer cross-write elimination circuit 208.

The address/parity addition circuit 201 is adapted to add an address, which indicates a position on the optical disc DK into which the data for recording is recorded, to the data inputted from the exterior through the input terminal IN, and it is further adapted to add parity for error correction (or for data verification). The data with the address or the like added is supplied to the correction code addition circuit 202.

The correction code addition circuit 202 adds a correction code for error correction (specifically, ECC (Error Correction Code)) to the data to which the address or the like is added. The correction code is added by each predetermined data unit (e.g. by a data unit of 32 KB). The data with the correction code or the like added is supplied to the scramble circuit 203.

The scramble circuit 203 performs a scramble process on the data to which the correction code or the like is added. The scrambled data is supplied to the 8/16 modulation/sync addition circuit 204.

The 8/16 modulation/sync addition circuit 204 performs 8/16 modulation on the scrambled data, and further adds a sync frame for synchronization in the recording and the reproduction. As a result of the aforementioned series of processes, a record signal S20 is generated.

The data division circuit 205 divides the record signal S20, which is supplied from the 8/16 modulation/sync addition circuit 204, into a record signal S21 for recording the data into the first recording layer L0 (hereinafter referred to as a "first record signal", as occasion demands) and a record signal S22 for recording the data into the second recording layer L1 (hereinafter referred to as a "second record signal", as occasion demands). A time division method of dividing a series of record signals S20 by a predetermined unit along a recording time axis is used, for example. After the division, the first record signal S21 is supplied to the strategy condition circuit 206 for the first recording layer, and the second record signal S22 is supplied to the strategy condition circuit 207 for the second recording layer.

Each of the strategy condition circuit 206 for the first recording layer and the strategy condition circuit 207 for the second recording layer constitutes one specific example of the "adjusting device" of the present invention with the control device C. Each of the strategy condition circuit 206 for the first recording layer and the strategy condition circuit 207 defines the waveform (i.e. write strategy) of the light beam emitted to record the data, on the basis of the first record signal S21 and the second record signal S22. Specifically, each of the strategy condition circuit 206 for the first recording layer and the strategy condition circuit 207 defines (or sets) the waveform of a driving pulse for driving each of the laser driving circuit D0 for the first recording layer and the laser driving circuit D1 for the second recording layer, which emit the light beams to record the data, respectively. For example, each of the strategy condition circuit 206 for the first recording layer and the strategy condition circuit 207 may define the amplitude of the waveform of the driving pulse, or may define the width of the waveform (e.g. a duty ratio, a length in the time axis direction, and the like). Alternatively, if the light beam is emitted with the waveform obtained by combining a plurality of pulses (i.e. multi pulse), Each of the strategy condition circuit 206 for the first recording layer and the strategy condition circuit 207 may define the number of the plurality of pulses, the combination, timing, and the like. By defining (or setting) the waveform or the like of the driving pulse, as described above, the waveform or the like of the emitted light beam is defined.

At this time, the strategy condition circuit 206 for the first recording layer adjusts, particularly, the amplitude of the waveform of the driving pulse (i.e. the amplitude of the waveform of the light beam and the power of the light beam), on the basis of an adjustment signal S23L0 supplied from the interlayer cross-write elimination circuit 208. Moreover, the strategy condition circuit 207 for the second recording layer adjusts, particularly, the amplitude of the waveform of the driving pulse, on the basis of an adjustment signal S23L1 supplied from the interlayer cross-write elimination circuit 208.

The interlayer cross-write elimination circuit 208 constitutes one specific example of the "calculating device" of the present invention with the control device C. The interlayer cross-write elimination circuit 208 compares reproduction signals S25L0 and S25L1 which are supplied from the reproduction device P, with the record signals S21 and S22 which are supplied from the data division circuit 205, to thereby calculate cross-write which is generated in the first recording layer L0 because of the light beam B1 emitted from the HR 112 for the second recording layer and cross-write which is generated in the second recording layer L1 because of the light beam A1 emitted from the HR 111 for the first recording layer.

Incidentally, the "cross-write" in the explanation in the embodiment particularly indicates the situation that the status of the first recording layer L0 is unintentionally changed or influenced by the light beam B1 emitted from the HR 112 for the second recording layer and the situation that the status of the second recording layer L1 is unintentionally changed or influenced by the light beam A1 emitted from the HR 111 for the first recording layer. More specifically, for example, it indicates the situation that the data recording into the first recording layer L0 influences the properties of the second recording layer L1, or the situation that the data recording into the second recording layer L1 influences the properties of the first recording layer L0. Such "cross-write" is generated mainly when the data is recorded into each of the first recording layer L0 and the second recording layer L1. Moreover, the generation of the "cross-write" can be a problem in each of the data recording and reproduction.

Moreover, the interlayer cross-write elimination circuit 208 generates the adjustment signals S23L0 and S23L1 which are used to adjust the pulse waveform, on the basis of the calculated cross-write, and supplies them to the strategy condition circuit 206 for the first recording layer and the strategy condition circuit 207 for the second recording layer, respectively.

Incidentally, the operation of the signal processing device SP will be detailed later (refer to FIG. 6 and FIG. 7).

Figure 5:
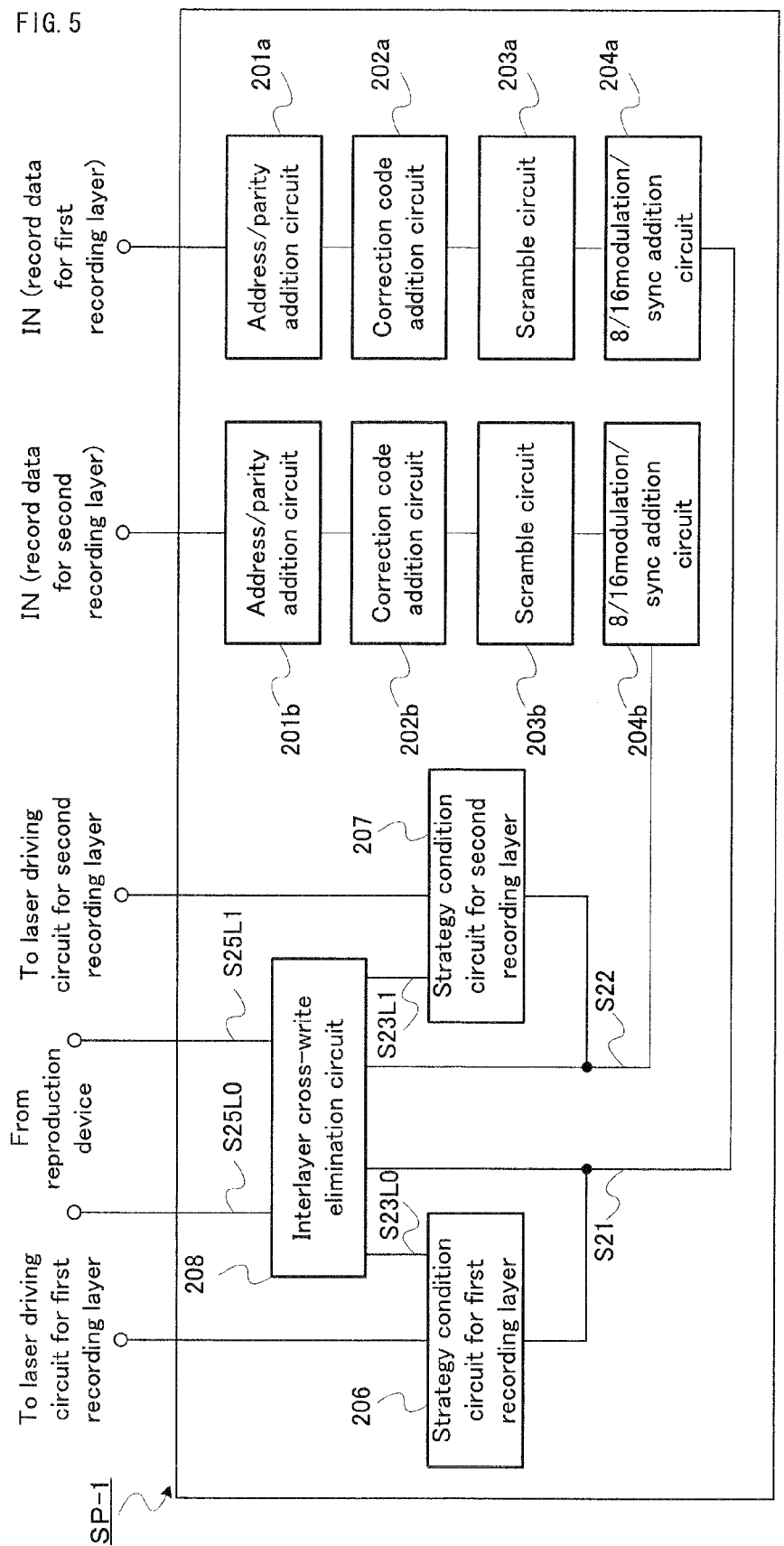
FIG. 5 is a block diagram showing another outline structure of a control device provided for the recording/reproducing apparatus in the embodiment.

Moreover, the recording/reproducing apparatus RP may be provided with a signal processing device SP-1, which has two input systems for inputting the record data, instead of the aforementioned signal processing device SP. The more specific structure of the signal processing device SP-1 will be explained with reference to FIG. 5. FIG. 5 is a block diagram showing the outline structure of a control device SP-1 provided for the recording/reproducing apparatus RP in the embodiment.

As shown in FIG. 5, the signal processing device SP-1 is provided with: a strategy condition circuit 206 for the first recording layer; a strategy condition circuit 207 for the second recording layer; and an interlayer cross-write elimination circuit 208, as in the signal processing device SP.

The signal processing device SP-1 is particularly provided with: an address/parity addition circuit 201a; a correction code addition circuit 202a; a scramble circuit 203a; and an 8/16 modulation/sync addition circuit 204a, which are for processing the data which is recorded into the first recording layer L0. Moreover, the signal processing device SP-1 is provided with: an address/parity addition circuit 201b; a correction code addition circuit 202b; a scramble circuit 203b; and an 8/16 modulation/sync addition circuit 204b, which are for processing the data which is recorded into the second recording layer L1.

As described above, since the signal processing device SP-1 has the two input systems for inputting the record data, it can perform the same operation as that of the signal processing device SP even if it does not have the data division circuit 205.

In FIG. 2 again, the laser driving circuit D0 for the first recording layer and the laser driving circuit D1 for the second recording layer are mainly formed of an amplification circuit. The laser driving circuit D0 for the first recording layer and the laser driving circuit D1 for the second recording layer amplify the record signals inputted from the signal processing device SP and then supply the record signals to the HR 111 for the first recording layer and the HR 112 for the second recording layer of the optical pickup PU, respectively. More specifically, the record signal for the first recording layer inputted from the signal processing device SP is amplified by the laser driving circuit D0 for the first recording layer, and then supplied to the HR 111 for the first recording layer. On the other hand, the record signal for the second recording layer inputted from the signal processing device SP is amplified by the laser driving circuit D1 for the second recording layer, and then supplied to the HR 112 for the second recording layer. The amplification factor (or gain) of each of the laser driving circuit D0 for the first recording layer and the laser driving circuit D1 for the second recording layer is controlled by the signal processing device SP. If the data is recorded onto the optical disc DK, the amplification factor (or gain) is controlled such that the light beam is outputted from the optical pickup PU with an energy amount which allows a predetermined change (e.g. a heat change, a phase change, or the like) (hereinafter referred to as a "recording power") on the recording surface of the optical disc DK. The amplification factor (or gain) or the like is controlled by the driving pulse, which is defined by the strategy condition circuit 206 for the first recording layer and the strategy condition circuit 207 for the second recording layer. In contrast, if the data recorded on the optical disc DK is reproduced, the amplification factor (or gain) is controlled such that the light beam is outputted from the optical pickup PU with an energy amount which does not allow a predetermined change (hereinafter referred to as a "reproduction power") on the optical disc DK.

The focus servo circuit FS generates a focus error signal on the basis of a light receiving signal S10F outputted from the HR 111 for the first recording layer, and it calculates a correction amount on the basis of the generated focus error signal. The light receiving signal S10F is a signal which is obtained by that a plurality of light receiving elements or the like receive the P-polarized reflected light received by the HR 111 for the first recording layer and which indicates the amount of the light received in each light receiving element. By operating or calculating the light receiving signal S10F of each light receiving element, the focus servo control signal S11F is generated on the focus servo circuit FS. The focus servo circuit FS supplies the generated focus servo control signal S11F to the actuator device 101. That is, the focus servo circuit FS supplies the focus servo control signal S11F, to thereby control the actuator device 101 through a not-illustrated focus actual driving circuit. And the focus servo circuit FS adjusts a distance of the objective lens 102 with respect to the optical disc DK.

The tracking servo circuit TS generates a tracking error signal on the basis of a light receiving signal S10T outputted from the HR 111 for the first recording layer, and it calculates a correction amount on the basis of the generated tracking error signal. The light receiving signal S10T is a signal which is obtained by that a plurality of light receiving elements or the like receive the P-polarized reflected light received by the HR 111 for the first recording layer and which indicates the amount of the light received in each light receiving element. By operating or calculating the light receiving signal S10T of each light receiving element, the tracking servo control signal S11T is generated on the tracking servo circuit TS. The tracking servo circuit TS supplies the generated tracking servo control signal S11T to the actuator device 101. That is, the tracking servo circuit TS supplies the tracking servo control signal S11T, to thereby control the actuator device 101 through a not-illustrated tracking actual driving circuit and displace the objective lens 102 in the radial direction (or tracking direction) of the optical disc.

The tracking error signal generation circuit TG generates a tracking error signal S13T on the basis of a light receiving signal S12T outputted from the HR 112 for the second recording layer. The light receiving signal S12T is a signal which is obtained by that a plurality of light receiving elements or the like receive the S-polarized reflected light received by the HR 112 for the second recording layer and which indicates the amount of the light received in each light receiving element. Here, as described above, in the optical pickup PU in the embodiment, tracking control is performed on the first recording layer L0 by the tracking servo circuit TS, and the P-polarized light beam A2 follows the record track on the first recording layer L0. Thus, the amount of the tracking error, generated on the basis of the light receiving signal S12T obtained from the second recording layer L1, indicates an eccentric amount between the first recording layer L0 and the second recording layer L1.

The tracking servo drive circuit TD calculates a correction amount on the basis of the generated tracking error signal S13T. More specifically, the tracking servo drive circuit TD obtains the eccentric amount generated between the first recording layer L0 and the second recording layer L1 of the optical disc DK, on the basis of the tracking error signal S13T generated on the tracking error signal generation circuit TG. Then, the tracking servo drive circuit TD generates the servo control signal S14T such that an error signal generated by the eccentric amount is substantially "0". After that, the tracking servo drive circuit TD supplies the generated servo control signal S14T to the piezo element 120. That is, the tracking servo drive circuit TD controls the piezo element 120 by supplying the servo control signal S14T thereto, and it displaces the HR 112 for the second recording layer in the radial direction (or tracking direction) of the optical disc such that an error signal generated by the eccentric amount, which is generated between the first recording layer L0 and the second recording layer L1 of the optical disc DK, is substantially "0".

The reproduction device P has an output terminal OUT. The reproduction device P generates a reproduction signal from light receiving signals S2 and S3 supplied from the HR 111 for the first recording layer and the HR 112 for the second recording layer, and it outputs reproduction data corresponding to the reproduction signal to the output terminal OUT. Moreover, the reproduction device P outputs the reproduction signal S25L0, which is generated from the light receiving signal S2 supplied from the HR 111 for the first recording layer, and the reproduction signal S25 L1, which is generated from the light receiving signal S3 supplied from the HR 112 for the second recording layer, to the signal processing device SP.

The LPP/wobble detection circuit LPD extracts a LPP signal component and a wobble signal component from the light receiving signal S2 supplied from the HR 111 for the first recording layer, and it extracts a LPP signal component and a wobble signal component from the light receiving signal S3 supplied from the HR 112 for the second recording layer. Then, the LPP/wobble detection circuit LPD supplies a detected LPP/wobble detection signal S6 to the drive circuit S for aberration correction.

The drive circuit S for aberration correction obtains the LPP/wobble detection signal S6 from the LPP/wobble detection circuit LPD, and it detects a phase difference between the LPP signal component/the wobble signal component, which are extracted from the light receiving signal S2, and the LPP signal component/the wobble signal component, which are extracted from the light receiving signal S3. After that, the drive circuit S for aberration correction controls the aberration correction element 121 so as to maximize the LPP/wobble detection signal S6 and the tracking error signal in the second recording layer on the basis of a phase difference signal corresponding to the detected phase difference, if the data is not recorded on the optical disc. In other words, the drive circuit S for aberration correction corrects spherical aberration so as to maximize the LPP/wobble detection signal S6 and the tracking error signal in the second recording layer. Alternatively, the drive circuit S for aberration correction controls the aberration correction element 121 so as to maximize a RF signal which is obtained by generating and amplifying the light receiving signal S3, which is outputted from the HR 112 for the second recording layer, on a RF amplifier (not illustrated), if the data is recorded on the optical disc 100.

Incidentally, in the embodiment, the aberration correction element 121 is provided for the HR 112 for the second recording layer; however, obviously, it may be provided for the HR 111 for the first recording layer. However, if the objective lens 102 is optically designed such that spherical aberration with respect to the HR 111 for the first recording layer is zero, spherical aberration is generated when the same objective lens is used to focus light on the second recording layer L1 which has a different substrate thickness. On the assumption of such a situation, the aberration correction element 121 is provided for the HR 112 for the second recording layer in the embodiment.

The control device C is formed mainly of a CPU (Central Processing Unit), and it controls various parts of the recording/reproducing apparatus RP. The recording/reproducing apparatus RP mainly controls the reproduction device P and the signal processing device SP.

Moreover, the control device C supplies a control signal S16 to the reproduction device P and supplies a control signal S17 to the signal processing device SP, to thereby control these devices as described above.

(Operation Principle)

Figure 7:
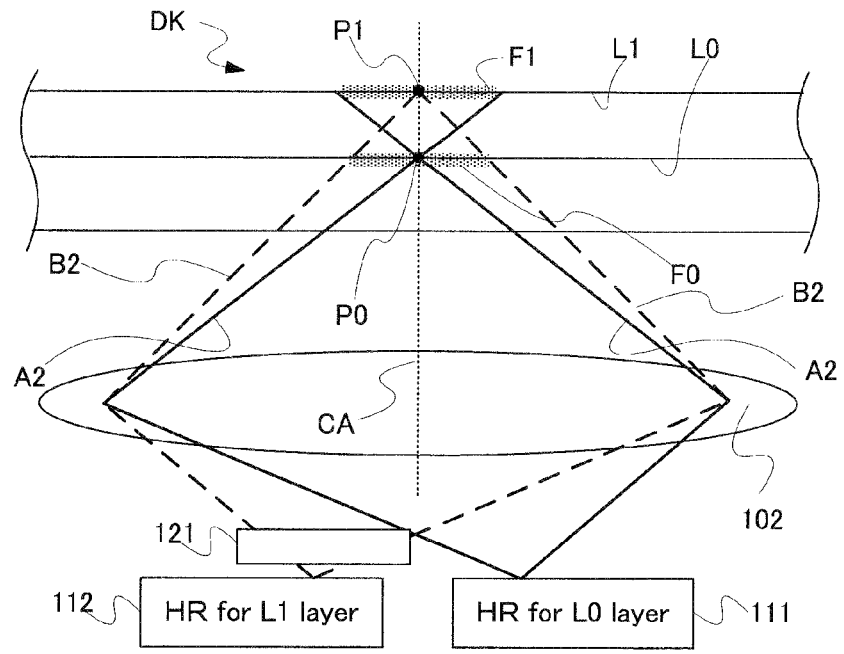
FIG. 7 are schematic diagrams showing the optical disc and the objective lens when the simultaneous recording is performed on the two recording layers, which are observed in the perpendicular direction to the radial direction of the optical disc.
Figure 7:
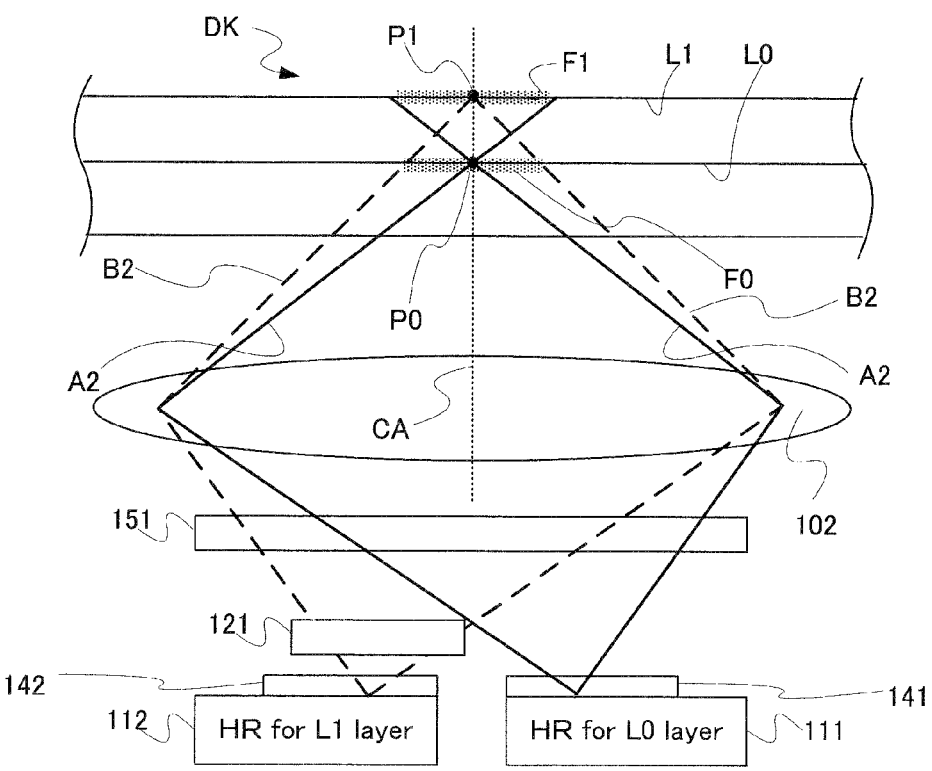
Figures 8, 9:
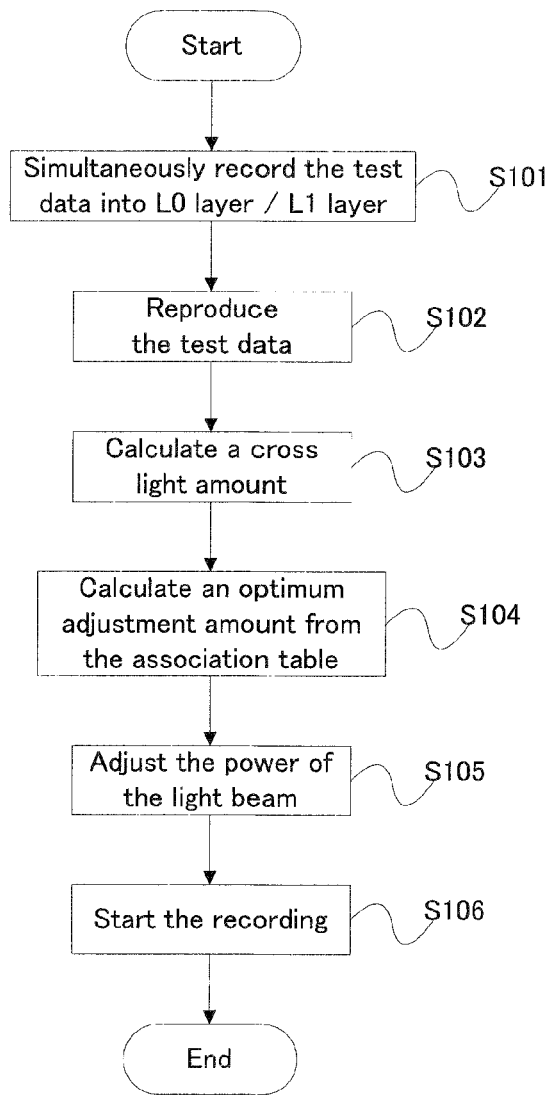
FIG. 8 is a flowchart roughly showing an operation principle of the recording/reproducing apparatus in the embodiment.
FIG. 9 is a table conceptually showing one specific example of an association table.

Next, with reference to FIG. 6 to FIG. 9, an explanation will be given on the operation principle of the recording/reproducing apparatus RP in the embodiment (in particular, the operation principle related to the recording operation). Each of FIG. 6 and FIG. 7 is a schematic diagram showing the optical disc DK and the objective lens, which are observed in a perpendicular direction to the radial direction of the optical disc DK. FIG. 8 is a flowchart roughly showing an operation principle of the recording/reproducing apparatus in the embodiment. FIG. 9 is a table conceptually showing one specific example of an association table.

Figure 6:
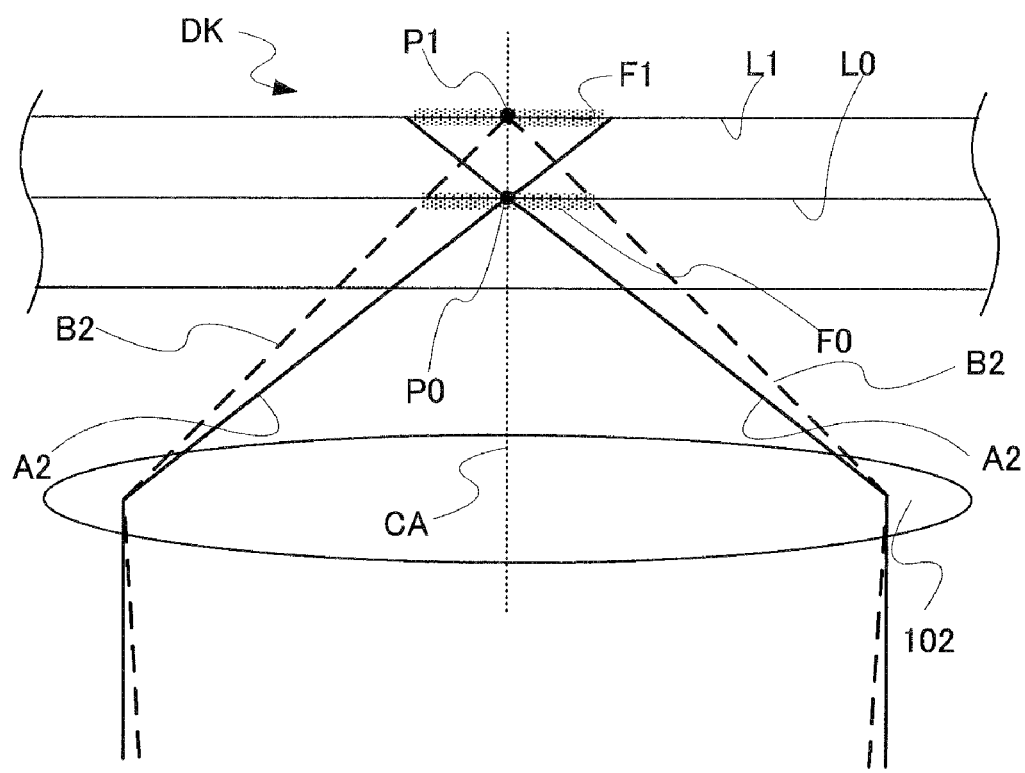
FIG. 6 is a schematic diagram showing the optical disc and an objective lens when simultaneous recording is performed on two recording layers, which are observed in a perpendicular direction to the radial direction of the optical disc.

As shown in FIG. 6, the P-polarized light beam A2 and the S-polarized light beam B2, which are transmitted through the objective lens 102, are focused on the optical disc DK. Both a focal point P0 of the P-polarized light beam A2 and a focal point P1 of the S-polarized light beam B2 are substantially located on a central axis CA of the objective lens 102. That is, both the optical axis of the P-polarized light beam A2 and the optical axis of the S-polarized light beam B2 match the central axis CA. In this case, the S-polarized light beam B2 is irradiated on an area expressed by a numerical reference F0 near the focal point P0 on the first recording layer L0. Moreover, the P-polarized light beam A2 is irradiated on an area expressed by a numerical reference F1 near the focal point P1 on the second recording layer L1.

At this time, as shown in FIG. 7(a), the optical pickup PU may be designed in a limited optical system. Designing the optical pickup PU in the limited optical system leads to a reduction in the number of parts, so that a simpler optical system can be realized. At the same time, the light beam irradiated from the HR 111 for the first recording layer and the light beam irradiated from the HR 112 for the second recording layer can be divided, geometric-optically.

In this case, as shown in FIG. 7(b), for example, the light beam may be irradiated by using a λ/4 plate 151 and polarization hologram elements 141 and 142 which allow the light receiving element to transmit 100% of the P-polarized light beam and thus not to perform a hologram operation, and which allow the light receiving element to receive 100% of the S-polarized light beam, which is returning light from the optical disc DK. That is, an isolate optical system may be used. By using the isolate optical system, it is possible to use the light beam without waste. With regard to the type of the emitted polarized light in this case, both of the two light beams may be P-polarized lights, and both of the two light beams may be S-polarized lights, or the two light beams may be a combination of P-polarized light and S-polarized light.

In any case of FIG. 6, FIG. 7(a), and FIG. 7(b), if one light beam with a certain degree of recording power is irradiated onto the focal point of the other light beam on one recording layer, the two light beams sometimes interfere with each other at this focal point. By this, there is a possibility that the cross-write is generated in the data recorded at the focal points P0 and P1, and this will prevent the simultaneous recording in the first recording layer L0 and the second recording layer L1.

Thus, the recording apparatus in the embodiment eliminates the influence of the cross-write by the operation of the signal processing device SP and performs the data recording operation.

Specifically, as shown in FIG. 8, before the data for recording is recorded, firstly, data for test recording (hereinafter referred to as "test data", as occasion demands) is recorded simultaneously into both the first recording layer L0 and the second recording layer L1 (step S101). At this time, the test data is preferably recorded into a recording area which does not hinder or which does not cause any trouble when the data for recording is recorded. Then, the data for test recording, which is simultaneously recorded, is reproduced (or simultaneously reproduced) (step S102).

After that, under the control of the control device C, a cross-write amount is calculated by the operation of the signal processing device SP (step S103). Specifically, each of the first record signal S21 and the second record signal S22, which are generated when the test data is recorded, are supplied to the interlayer cross-write elimination circuit 208 in the signal processing device SP from the data division circuit 205. Moreover, the reproduction signals S25L0 and S25L1, which are obtained by reproducing the test data actually recorded, are supplied to the interlayer cross-write elimination circuit 208. If the cross-write is not generated, the first record signal S21 and the reproduction signal S25L0, and further the second record signal S22 and the reproduction signal S25L1 should match. In other words, if the first record signal S21 and the reproduction signal S25L0, and further the second record signal S22 and the reproduction signal S25L1 do not match, that means that the cross-write is generated. Therefore, the cross-write amount can be calculated by calculating a difference between the first record signal S21 and the reproduction signal S25L0, and a difference between the second record signal S22 and the reproduction signal S25L1. At this time, from the difference between the first record signal S21 of the test data recorded in the first recording layer L0 and the reproduction signal S25L0 of the test data recorded in the first recording layer L0, the cross-write amount generated in the first recording layer L0 because of the light beam emitted from the HR 112 for the second recording layer is calculated. Moreover, from the difference between the second record signal S22 of the test data recorded in the second recording layer L1 and the reproduction signal S25L1 of the test data recorded in the second recording layer L1, the cross-write amount generated in the second recording layer L1 because of the light beam emitted from the HR 111 for the first recording layer is calculated. The cross-write amount is calculated by a unit of decibel (dB), for example.

Then, on the basis of the calculated cross-write amount, an optimum adjustment value is calculated, which is to adjust the power of the light beam (step S104). The adjustment value is calculated on the basis of the association table, which indicates an association relationship between the cross-write amount (CW amount) and the adjustment value of the power of the light beam, as shown in FIG. 9. The association table defines increment (or decrement) in the power of the light beam to be adjusted, by using a ratio (%) with respect to a predetermined reference power, for example, in the case that a predetermined cross-write light amount is calculated in the first recording layer L0 (or the second recording layer L1). In other words, the association table defines the adjustment amount of the power of the light beam which can cancel the cross-write amount (specifically, which can set it "0") in the first recording layer L0 (or the second recording layer L1).

The association table may be stored in advance in a memory in the recording/reproducing apparatus RP, or it may be recorded in advance on the optical disc DK. Alternatively, under the control of the control device C, which constitutes one specific example of the "generating device", it may be generated, as occasion demands, on the basis of the cross-write amount calculated in the step S103 and the power value adjusted at that time. If the association table is generated, as occasion demands, it is preferable to record the test data the predetermined number of times with changing the power of the light beam, continuously or step by step, before the recording of the data for recording, to thereby calculate the cross-write amount, as occasion demands.

Incidentally, it is obvious that the association table is not limited to the aspect shown in FIG. 9. For example, it may be a predetermined function. Any information that can calculate the power of the light beam which allows the data to be preferably recorded (e.g. which can set the cross-write amount to "0" or which can cancel it) can be used as the aforementioned association table.

Then, on the basis of the calculated optimum adjustment value, the power of the light beam is actually adjusted (step S105). That is, the power of each or at least one of the light beam emitted from the HR 111 for the first recording layer and the light beam emitted from the HR 112 for the second recording layer is adjusted. At this time, each parameter other than the power (e.g. a waveform shape, a multi pulse shape, or the like) is also preferably set by the operations of the strategy condition circuit 206 for the first recording layer and the strategy condition circuit 207 for the second recording layer. After that, the data for recording is actually recorded (step S106).

As explained above, according to the recording apparatus in the embodiment, since the light beams are emitted simultaneously from both the HR 111 for the first recording layer and the HR 112 for the second recording layer, it is possible to simultaneously record the data into both the first recording layer L0 and the second recording layer L1. By this, the recording/reproducing apparatus RP can substantially double a recording speed, compared to the case that the data is recorded into each one layer. For example, in case of the recording/reproducing apparatus which can record the data only into one recording layer (or single layer) at a 16× recording speed (i.e. a recording speed about 16 times larger than a reference speed), it can realize a 32× recording speed by simultaneous recording in the two layers. Of course, the same is true for the data reproduction.

Moreover, the recording apparatus in the embodiment can record the data while eliminating the influence of the cross-write, which is generated in each recording layer because of the plurality of light beams and which is a problem in the simultaneous recording. Thus, it is possible to simultaneously record the data into both the first recording layer L0 and the second recording layer L1, preferably.

Figure 10:
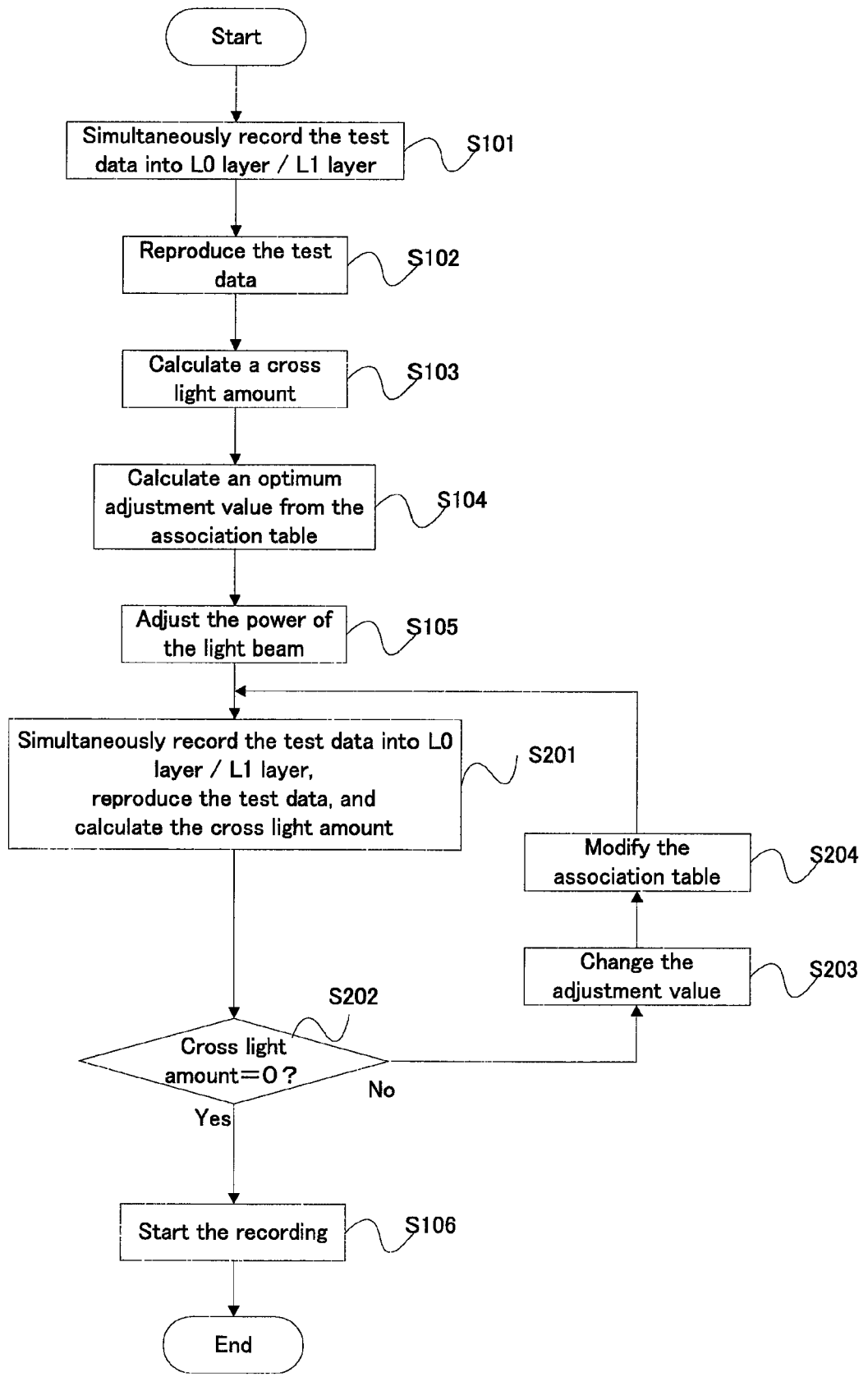
FIG. 10 is a flowchart roughly showing another operation principle of the recording/reproducing apparatus in the embodiment.

Incidentally, after the power of the light beam is adjusted in the step S105 in FIG. 8, the test data may be further recorded with the light beam after the power adjustment. An aspect of this operation will be explained with reference to FIG. 10. FIG. 10 is a flowchart roughly showing another operation principle of the recording/reproducing apparatus RP in the embodiment.

As shown in FIG. 10, the step S101 to the step S105 are performed, and the power of the light beam is adjusted. After that, the test data is simultaneously recorded again into both the first recording layer L0 and the second recording layer L1 by using the light beam whose power is adjusted, and then, the simultaneously recorded test data is reproduced, to thereby calculate the cross-write amount (step S201). This operation is performed in the same aspect as that in the step S101 to the step S103.

Then, it is judged whether or not the cross-write amount calculated in the step S201 is "0" (i.e. whether or not the cross-write is generated) (step S202). That is, it is judged whether or not the light beam whose power is adjusted in the step S105 causes the cross-write. If the cross-write amount is "0", it is considered that the power of the light beam is preferably adjusted in the step S105, so that the operational flow can move directly to the recording operation of the data for recording. On the other hand, if the cross-write amount is not "0", it is considered that the power of the light beam is not preferably adjusted in the step S105, so that it is necessary to adjust the power again without moving directly to the recording operation of the data for recording, in order to ensure the preferable recording operation.

As a result of the judgment, if it is judged that the cross-write amount is "0" (the step S202: Yes), the data for recording is recorded as it is (step S106).

On the other hand, if it is judged that the cross-write amount is not "0" (the step S202: No), the adjustment value of the power of the light beam is changed (step S203), and the power of the light beam is adjusted again. After that, under the control of the control device C, which constitutes one specific example of the "modifying device" of the present invention, the association table is modified on the basis of the power adjustment result in the step S203 (step S204). After that, the operational flow returns to the step S201. This operation is continued until the cross-write amount becomes "0".

By this, since the power of the light beam is adjusted until the cross-write amount become "0", it is possible to simultaneously record the data into both the first recording layer L0 and the second recording layer L1.

Figure 11:
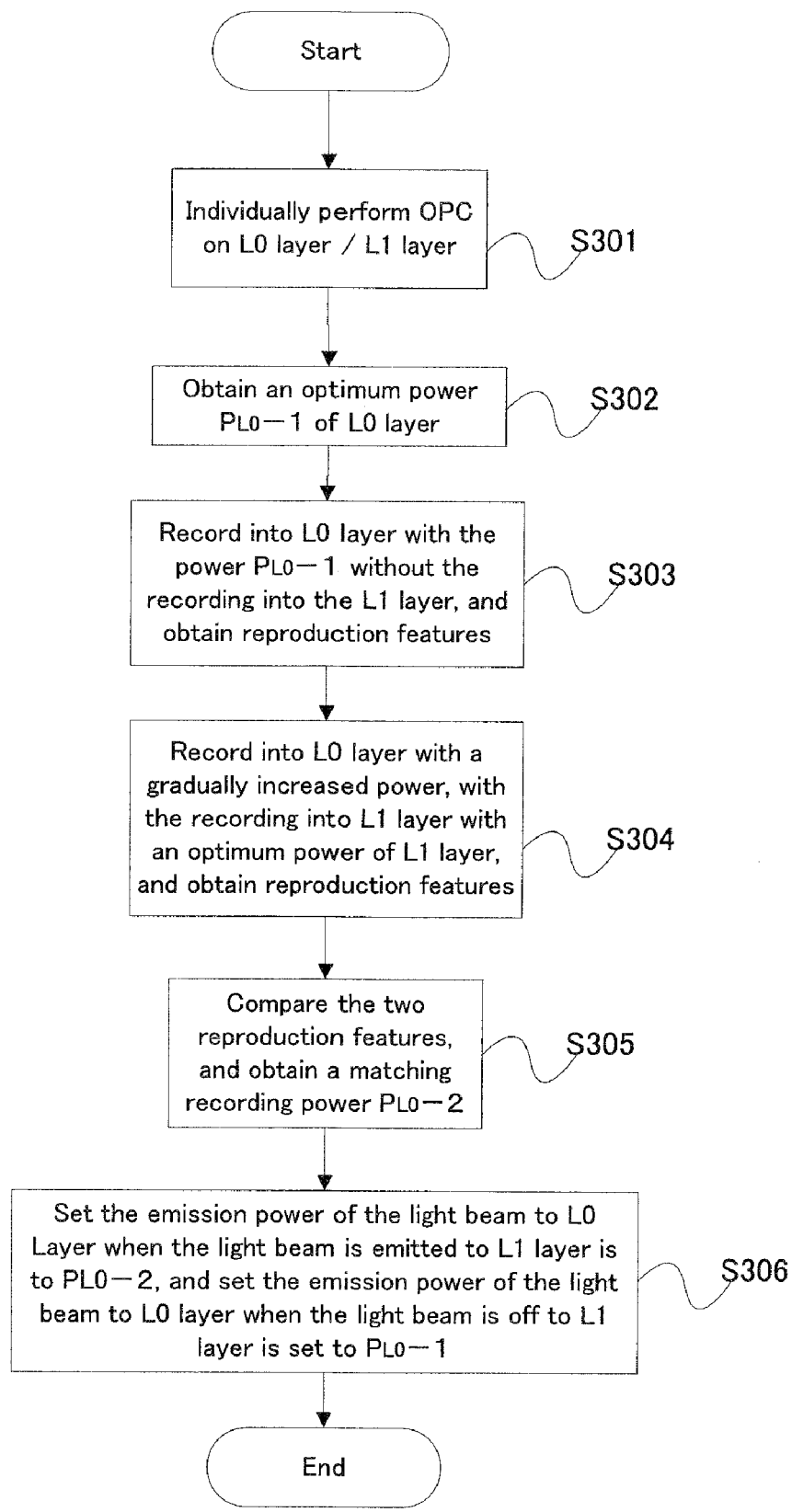
FIG. 11 is a flowchart roughly showing another operation principle of the recording/reproducing apparatus in the embodiment.

Moreover, in addition to or instead of using the association table, the power may be directly modified, on the basis of the measurement result of the recording and reproduction properties (in other words, the measurement result of the cross-write amount) in each of the first recording layer L0 and the second recording layer L1. Such construction will be explained with reference to FIG. 11. FIG. 11 is a flowchart roughly showing another operation principle of the recording/reproducing apparatus RP in the embodiment.

As shown in FIG. 11, firstly, an OPC process is individually performed on each of the first recording layer L0 and the second recording layer L1 (step S301). As a result of the OPC process, the optimum power of the light beam when the data is recorded into the first recording layer L0 and the optimum power of the light beam when the data is recorded into the second recording layer L1 are obtained (step S302). In particular, the power when the data is recorded into the first recording layer L0 is expressed by "$P_{L0}$-1", and the power when the data is recorded into the second recording layer L1 is expressed by "$P_{L1}$-1".

Then, the data is recorded into the first recording layer L0 without the recording of the data into the second recording layer L1. The power of the light beam at this time is set to "$P_{L0}$-1" obtained in the step S302. Then, the reproduction features of the L0 layer with the data recorded are obtained (step S303). As the reproduction features, there are listed, for example, an asymmetry value, degree of modulation, a jitter value, an error rate value, wobble feature, or other features, as one specific example. Then, the data is recorded into the first recording layer L0 while the data is recorded into the second recording layer L1. That is, the light beam is irradiated from each of the HR 111 for the first recording layer and the HR 112 for the second recording layer. The power of the light beam emitted from the HR 112 for the second recording layer at this time is set to "$P_{L1}$-1" obtained in the step S302. Moreover, the power of the light beam emitted from the HR 111 for the first recording layer at this time is set to be changed continuously or step by step. For example, it may be set to be reduced, continuously or step by step, from "$P_{L0}$-1" obtained in the step S302. Alternatively, centered on "$P_{L0}$-1" obtained in the step S302, the power of the light beam may be set to be increased, continuously or step by step, from a smaller power than "$P_{L0}$-1" to a larger power than "$P_{L0}$-1". Then, the reproduction features of the first recording layer L0 with the data recorded are obtained (step S304).

After that, a power "$P_{L0}$-2" is obtained at which the reproduction features which match the reproduction features measured in the step S303 are measured in the step S304 (step S305). In other words, such a power "$P_{L0}$-2" is obtained that the cross-write amount is substantially "0" (i.e. the reproduction features measured in the step S303 match the reproduction features measured in the step S304) in the range of the power changed in the step S304.

After that, in the actual data recording operation, the power of the light beam is set as follows (step S306). Specifically, if the light beam with the recording power is irradiated from each of the HR 111 for the first recording layer and the HR 112 for the second recording layer, the power of the light beam emitted from the HR 111 for the first recording layer is set to "$P_{L0}$-2" in order to record the data into the first recording layer L0. On the other hand, if the light beam with the recording power is emitted from the HR 111 for the first recording layer but the light beam with the recording power is not emitted from the HR 112 for the second recording layer, the power of the light beam emitted from the HR 111 for the first recording layer is set to "$P_{L0}$-1" in order to record the data into the first recording layer L0. By such construction, it is possible to record the data while eliminating the influence of the cross-write, as described above.

Incidentally, the explanation in FIG. 11 focuses on the power of the light beam emitted from the HR 111 for the first recording layer. However, obviously, the same operation is also performed with regard to the power of the light beam emitted from the HR 112 for the second recording layer in the case that the data is recorded into the second recording layer L1.

More specifically, in the step S303, instead of the aforementioned operation, the data is recorded into the second recording layer L1 without the recording of the data into the first recording layer L0. That is, the light beam is not emitted from the HR 111 for the first recording layer, while the light beam is emitted from the HR 112 for the second recording layer. The power of the light beam at this time is set to "$P_{L1}$-1" obtained in the step S302. Then, the reproduction features of the L1 layer with the data recorded are obtained. Then, in the step S304, instead of the aforementioned operation, the data is recorded into the second recording layer L1 while the data is recorded into the first recording layer L0. That is, the light beam is emitted from each of the HR 111 for the first recording layer and the HR 112 for the second recording layer. The power of the light beam emitted from the HR 111 for the first recording layer at this time is set to "$P_{L0}$-1" obtained in the step S302. Moreover, the power of the light beam emitted from the HR 112 for the second recording layer is set to be changed continuously or step by step. For example, it may be set to be reduced, continuously or step by step, from "$P_{L1}$-1" obtained in the step S302. Alternatively, centered on "$P_{L1}$-1" obtained in the step S302, the power of the light beam may be set to be increased, continuously or step by step, from a smaller power than "$P_{L1}$-1" to a larger power than "$P_{L1}$-1". Then, the reproduction features of the second recording layer L1 with the data recorded are obtained.

After that, in the step S305, instead of the aforementioned operation, a power "$P_{L1}$-2" is obtained at which the reproduction features which match the reproduction features measured in the step S303 are measured in the step S304. In other words, such a power "$P_{L1}$-2" is obtained that the cross-write amount is substantially "0" (i.e. the reproduction features measured in the step S303 match the reproduction features measured in the step S304) in the range of the power changed in the step S304.

After that, in the actual data recording operation, the power of the light beam is set as follows. Specifically, if the light beam with the recording power is irradiated from each of the HR 111 for the first recording layer and the HR 112 for the second recording layer, the power of the light beam emitted from the HR 112 for the second recording layer is set to "$P_{L1}$-2" in order to record the data into the second recording layer L1. On the other hand, if the light beam with the recording power is not emitted from the HR 111 for the first recording layer but the light beam with the recording power is emitted from the HR 112 for the second recording layer, the power of the light beam emitted from the HR 112 for the second recording layer is set to "$P_{L1}$-1" in order to record the data into the second recording layer L1. By such construction, it is possible to record the data while eliminating the influence of the cross-write, as described above.

MODIFIED EXAMPLE

Figure 12:
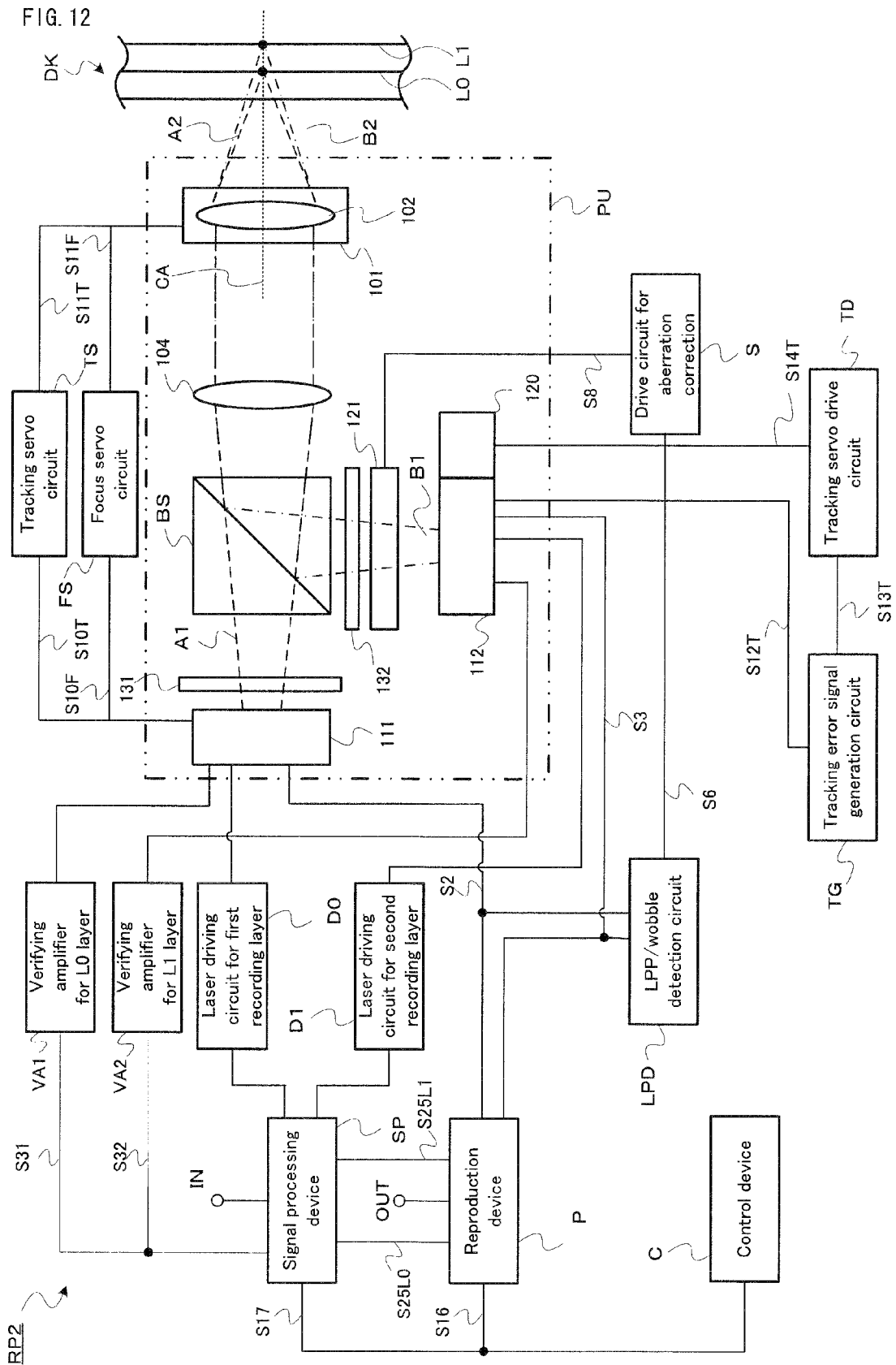
FIG. 12 is a block diagram conceptually showing the basic structure of a recording/reproducing apparatus RP2 in a modified example.
Figure 13:
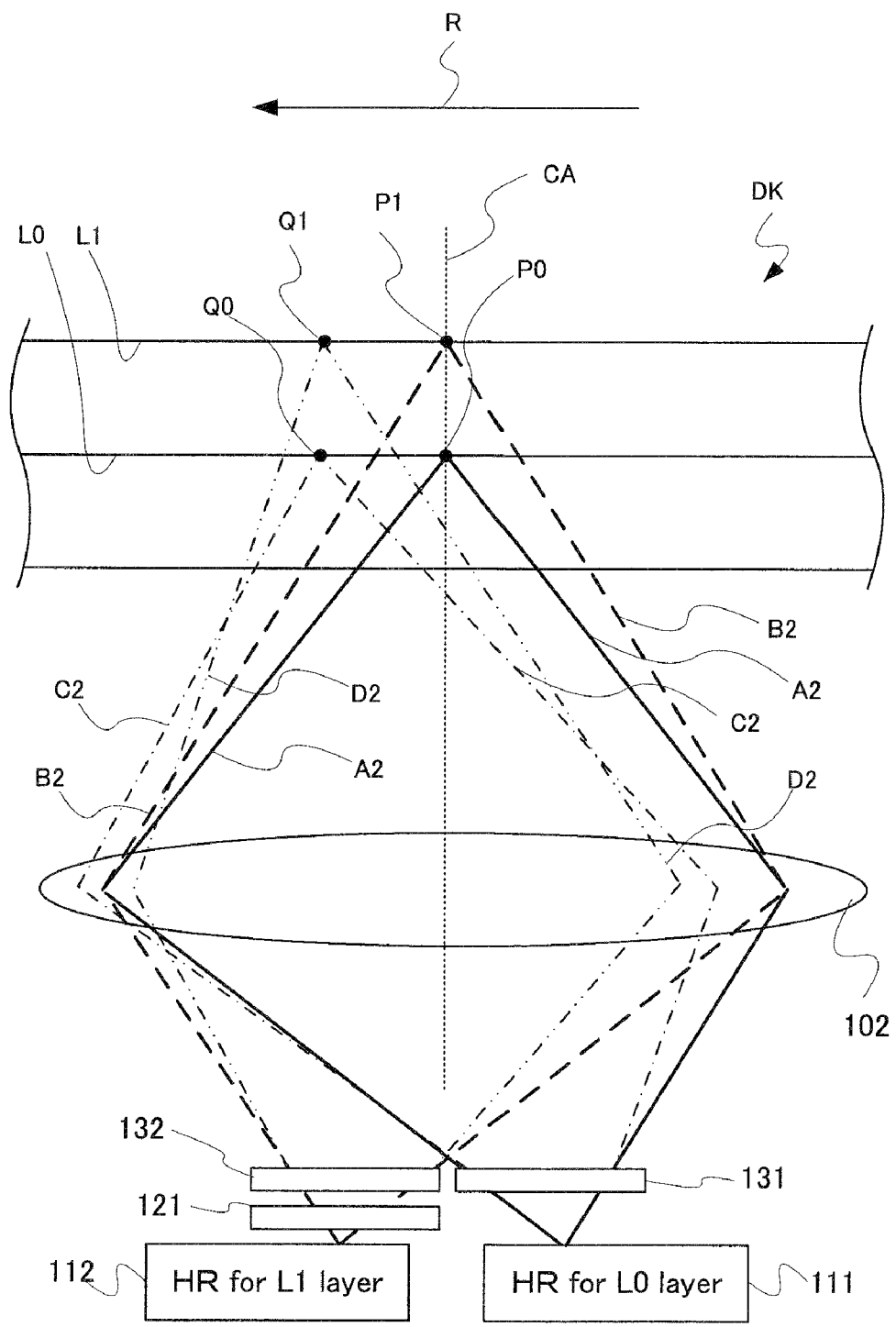
FIG. 13 is a diagram showing an optical disc DK and an objective lens, which are observed in a perpendicular direction to the radial direction of the optical disc DK.

Next, with reference to FIG. 12 and FIG. 13, a recording/reproducing apparatus RP2 in a modified example will be explained. FIG. 12 is a block diagram conceptually showing the basic structure of the recording/reproducing apparatus RP2 in the modified example. FIG. 13 is a diagram showing an optical disc DK and an objective lens, which are observed in a perpendicular direction to the radial direction of the optical disc DK. Incidentally, the same constituent elements as those in the recording/reproducing apparatus RP described above carry the same numerical references, and the explanation thereof will be omitted.

As shown in FIG. 12, the recording/reproducing apparatus RP2 in the modified example has the same structure as that of the aforementioned recording/reproducing apparatus RP. In particular, the recording/reproducing apparatus RP2 in the modified example is provided with: a grating 131 for the first recording layer; a grating 132 for the second recording layer; a verifying amplifier VA1 for the first recording layer; and a verifying amplifier VA2 for the second recording layer.

The grating 131 for the first recording layer and the grating 132 for the second recording layer diffract the light beam, and generate a recording light beam to record the data for recording and a verification light beam used for the verification. Each of the grating 131 for the first recording layer and the grating 132 for the second recording layer may include a transparent substrate having many slits (or grooves), or a liquid crystal slit.

Specifically, the grating 131 for the first recording layer is disposed between the HR 111 for the first recording layer and the beam splitter BS. The grating 132 for the second recording layer is disposed between the HR 112 for the second recording layer and the beam splitter BS. Then, if the light beam emitted from the HR 111 for the first recording layer enters the grating 131 for the first recording layer, the recording light beam A2 to record the data for recording into the first recording layer L0 and the verification light beam C2 for verifying the first recording layer L0 are generated, as shown in FIG. 13. Moreover, if the light beam emitted from the HR 112 for the second recording layer enters the grating 132 for the second recording layer, the recording light beam B2 for recording the data for recording into the second recording layer L1 and the verification light beam D2 for verifying the second recording layer L1 are generated.

Incidentally, in FIG. 13, the optical disc DK is rotated in an arrow R direction. That is, the light beam travels in the opposite direction to the arrow R. In this case, the verification light beam C2 for verifying the first recording layer L0 is focused on a position (point Q0) which follows the focal point P0 of the recording light beam A2 to record the data for recording into the first recording layer L0 along the light beam travelling direction. In the same manner, the verification light beam D2 for verifying the second recording layer L1 is focused on a position (point Q1) which follows the focal point P1 of the recording light beam B2 to record the data for recording into the second recording layer L1 along the light beam travelling direction.

The verifying amplifier VA1 for the first recording layer amplifies the light receiving signal of the reflected light of the verification light beam C2 for verifying the first recording layer L0, which is generated on the grating 131 for the first recording layer, and supplies it as a verification signal S31 (i.e. the aforementioned reproduction signal) to the signal processing device SP. Moreover, the verifying amplifier VA2 for the second recording layer amplifies the light receiving signal of the reflected light of the verification light beam D2 for verifying the second recording layer L1, which is generated on the grating 132 for the second recording layer, and supplies it as a verification signal S32 to the signal processing device SP.

The recording/reproducing apparatus RP2 in the modified example having such construction calculates the cross-write amount by reproducing the actually recorded data for recording with the verification light beam, in addition to or instead of calculating the cross-write amount by recording the test data. Specifically, the predetermined data for recording is reproduced by using the verification light beam, and the verification signal S31 is supplied to the signal processing device SP from the verifying amplifier VA1 for the first recording layer. Moreover, the first record signal S21 when the predetermined data for recording is recorded is supplied to the signal processing device SP. By comparing the verification signal S31 with the first record signal S21, it is possible to calculate the cross-write amount generated in the first recording layer L0 because of the light beam emitted from the HR 112 for the second recording layer. After that, the same operation as that in the aforementioned recording/reproducing apparatus RP is performed. Of course, the same operation is also performed with regard to the second recording layer L1.

As described above, according to the recording/reproducing apparatus RP2 in the modified example, it is possible to calculate the cross-write amount from the actually recorded data without recording the test data. Thus, it is possible to adjust the power of the light beam such that the cross-write amount becomes "0", in accordance with the actual recording aspect. Therefore, it is possible to simultaneously record the data into both the first recording layer L0 and the second recording layer L1, more preferably. Moreover, since not only the recording light beam but also the verification light beam are emitted, it is possible to calculate the cross-write amount without stopping the recording operation of the data for recording, and to adjust the power of the light beam. By this, the power of the light beam can be preferably adjusted in real time in parallel with the recording operation of the data for recording. As a result, it is possible to simultaneously record the data into both the first recording layer L0 and the second recording layer L1, more preferably.

Incidentally, even if the verification light beam is not separately generated, as described above, for example, if a three-beam tracking method, which is one method of tracking control, is employed, a following beam of the three beams may be used as the verification light beam described above.

Incidentally, the present invention is not limitedly applied to the recording/reproducing apparatus for the dual-layer type optical disc DK, and it may be applied to a recording/reproducing apparatus for a multilayer type optical disc having three or more layers. In this case, an optical pickup in recording/reproducing apparatus is provided with hologram lasers corresponding to the number of the recording layers of the optical disc. Then, the power of each light beam is adjusted by the operation of the signal processing device SP such that the cross-write is not generated by the light beam emitted from each hologram laser.

Moreover, the laser tip, the light receiving element, and the like may be provided separately and individually, instead of the hologram laser HR that integrally has the laser tip, the light receiving element, and the like.

Moreover, the present invention is not limitedly applied to the recording/reproducing apparatus for the optical disc which is provided with the groove track and the land track in both the first recording layer L0 layer and the second recording layer L1. That is, the present invention can be also applied to a recording/reproducing apparatus for an optical disc which is provided with the groove track and the land track only in the first recording layer L0 but not in the second recording layer L1. In this case, the data is recorded into the second recording layer L1 by using the groove track and the land track provided in the first recording layer L0.

Incidentally, the aforementioned embodiments show the simultaneous recording into the plurality of recording layers. Based on the same principle, simultaneous reproduction of the data recorded in the plurality of recording layers and simultaneous recording/reproduction (specifically, such an operation that the data is recorded into one recording layer, while the data recorded in another recording layer is reproduced) can also appropriately performed without the cross-write. Therefore, the recording/reproducing apparatus RP can also improve a reproduction speed.

Moreover, in the aforementioned embodiments, a DVD or the like is explained as a specific example of the optical disc, and a recorder or a player related to the optical disc is explained as one example of the recording/reproducing apparatus. The present invention, however, is not limited to the optical disc, such as DVD, and its recorder, and it can be also applied to other various recording media which support high-density recording or high transfer rate, and their recorders or players.

The present invention is not limited to the aforementioned embodiments, and various changes may be made without departing from the essence or spirit of the invention which can be read from the claims and the entire specification. A recording apparatus and method, and a computer program for recording control, which involve such changes, are also intended to be within the technical scope of the present invention.

INDUSTRIAL APPLICABILITY

The recording apparatus and method, and the computer program according to the present invention can be applied to a recording apparatus, such as a DVD recorder. Moreover, they can also applied to a recording apparatus or the like which can be mounted on or which can be connected to various computer equipment for commercial use or for business use.

The invention claimed is:

1. A recording apparatus for recording record data onto a recording medium on which a plurality of recording layers are formed in a thickness direction, said recording apparatus comprising:
   a recording device for recording the record data into each of the plurality of recording layers by emitting each of a plurality of recording light beams to be focused on a corresponding one of the plurality of recording layers;
   a calculating device for calculating a leaked beam feature of another recording light beam, which is emitted to be focused on another recording layer other than one recording layer of the plurality of recording layers, leaking to the one recording layer; and
   an adjusting device for adjusting an emission condition of at least one of the plurality of recording light beams, on the basis of the calculated leaked beam feature.

2. The recording apparatus according to claim 1, wherein said calculating device calculates a plurality of the leaked beam features such that each of the plurality of recording layers becomes the one recording layer in order, and said adjusting device adjusts the emission condition on the basis of the plurality of leaked beam features.

3. The recording apparatus according to claim 1, wherein said adjusting device adjusts the emission condition such that recording quality of the record data when the record data is recorded into the one recording layer without emitting the another recording light beam substantially matches recording quality of the record data when the record data is recorded into the one recording layer with emitting the another recording light beam.

4. The recording apparatus according to claim 3, wherein the recording quality is at least one of asymmetry, degree of modulation, jitter, error rate, and wobble feature.

5. The recording apparatus according to claim 1, wherein the leaked beam feature is extent of cross-write in the one recording layer, which is caused by the another recording light beam.

6. The recording apparatus according to claim 5, wherein said adjusting device adjusts the emission condition such that an influence of the cross-write is substantially zero.

7. The recording apparatus according to claim 1, wherein said adjusting device adjusts a power of each of the recording light beams, as the emission condition.

8. The recording apparatus according to claim 1, wherein said adjusting device adjusts the emission condition, on the basis of association information which indicates an association between the leaked beam feature and the emission condition of the recording light beam.

9. The recording apparatus according to claim 1, further comprising a generating device for generating association information which indicates an association between the leaked beam feature and the emission condition of the recording light beam.

10. The recording apparatus according to claim 8, further comprising a modifying device for modifying the association information, on the basis of an adjustment result by said adjusting device.

11. The recording apparatus according to claim 1, wherein said calculating device calculates the leaked beam feature again after the emission condition is adjusted by said adjusting device, and said adjusting device adjusts the emission condition again, on the basis of the leaked beam feature calculated again.

12. The recording apparatus according to claim 1, further comprising:
   a controlling device for controlling said recording device to record test data into each of the plurality of recording layers, as the record data; and
   a reading deice for reading the test data recorded in the one recording layer,
   said calculating device comparing the test data actually recorded by said recording device with the test data read by said reading device, to thereby calculate the leaked beam feature.

13. The recording apparatus according to claim 1, further comprising:
   a verifying device for reading the record data recorded by said recording device, by emitting each of a plurality of verification light beams on a corresponding one of the plurality of recording layers,
   said calculating device calculating the leaked beam feature on the basis of the record data read by said verifying device.

14. The recording apparatus according to claim 13, wherein said calculating device compares the record data actually recorded by said recording device with the record data read by said verifying device, to thereby calculate the leaked beam feature.

15. The recording apparatus according to claim 13, wherein a focal point of the verification light beam follows a focal point of the recording light beam, in a travelling direction of the recording light beam with respect to the recording medium.

16. The recording apparatus according to claim 1, wherein said recording device simultaneously emits each of the plurality of recording light beams to be focused on the corresponding one of the plurality of recording layers, to thereby simultaneously record the record data into each of the plurality of recording layers.

17. A computer program product in a computer-readable medium for tangibly embodying a program of instructions executable by a computer provided in the recording apparatus according to claim 1, said computer program making the computer function as at least one portion of said recording device, said calculating device, and said adjusting device.

18. A recording method of recording record data onto a recording medium on which a plurality of recording layers are formed in a thickness direction, said recording method comprising:
   a recording process of recording the record data into each of the plurality of recording layers by emitting each of a plurality of recording light beams to be focused on a corresponding one of the plurality of recording layers;
   a calculating process of calculating a leaked beam feature of another recording light beam, which is emitted to be focused on another recording layer other than one recording layer of the plurality of recording layers, leaking to the one recording layer; and
   an adjusting process of adjusting an emission condition of at least one of the plurality of recording light beams, on the basis of the calculated leaked beam feature.

* * * * *